United States Patent
Yamazaki et al.

(10) Patent No.: US 8,488,425 B2
(45) Date of Patent: Jul. 16, 2013

(54) OPTICAL PICKUP DEVICE AND OPTICAL DISC APPARATUS

(75) Inventors: Kazuyoshi Yamazaki, Yamato (JP); Tomoto Kawamura, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/955,269

(22) Filed: Nov. 29, 2010

(65) Prior Publication Data

US 2011/0211437 A1 Sep. 1, 2011

(30) Foreign Application Priority Data

Feb. 26, 2010 (JP) ................................. 2010-041267

(51) Int. Cl.
*G11B 7/00* (2006.01)

(52) U.S. Cl.
USPC ... 369/44.37; 369/44.42; 369/94; 369/112.07

(58) Field of Classification Search
USPC ............. 369/44.37, 44.41, 44.23, 94, 112.05, 369/112.07, 44.42
See application file for complete search history.

(56) References Cited

U.S. PATENT DOCUMENTS

| | | | | |
|---|---|---|---|---|
| 5,648,950 A * | 7/1997 | Takeda et al. | ............... | 369/44.37 |
| 5,761,174 A * | 6/1998 | Takeda et al. | ............... | 369/44.37 |
| 5,923,632 A | 7/1999 | Kato et al. | | |
| 7,567,495 B2 * | 7/2009 | Kamisada et al. | ........ | 369/112.12 |
| 7,660,226 B2 | 2/2010 | Ogata | | |
| 7,800,986 B2 * | 9/2010 | Kobayashi et al. | ........ | 369/44.42 |
| 8,040,780 B2 * | 10/2011 | Yamazaki et al. | ....... | 369/112.07 |
| 2006/0083146 A1 * | 4/2006 | Isshiki et al. | ............. | 369/112.03 |
| 2006/0227678 A1 | 10/2006 | Hong et al. | | |
| 2007/0171786 A1 | 7/2007 | Kobayashi et al. | | |
| 2008/0165655 A1 * | 7/2008 | Saitoh et al. | ............. | 369/109.01 |
| 2008/0247298 A1 | 10/2008 | Ogata | | |
| 2009/0086610 A1 * | 4/2009 | Tsuboi et al. | ............ | 369/112.16 |
| 2009/0185471 A1 | 7/2009 | Yamazaki | | |
| 2010/0061202 A1 * | 3/2010 | Yamazaki et al. | ......... | 369/44.23 |

FOREIGN PATENT DOCUMENTS

| | | |
|---|---|---|
| JP | 2006-294215 | 10/2006 |
| JP | 2006-344344 | 12/2006 |
| JP | 2007-172793 | 7/2007 |
| JP | 2009-170060 | 7/2009 |
| WO | WO 96/20473 | 7/1996 |

* cited by examiner

*Primary Examiner* — Thang Tran

(74) *Attorney, Agent, or Firm* — McDermott Will & Emery LLP

(57) ABSTRACT

An optical pickup device including: a laser diode for emitting laser light; an objective lens which irradiates an optical beam emitted from the laser diode; an actuator which displaces the objective lens in a radius direction of the optical disc; a grating for branches an optical beam reflected by an information recording layer into plural regions; and one photodetector having plural light receiving parts for receiving the branched optical beams, wherein the photodetector has a first light receiving part which detects zero-th order grating diffracted light and plural second light receiving parts which detecting grating diffracted light having an order not less than that of ±first order grating diffracted light; a detected signal of the zero-th order grating diffracted light is defined as a reproduction signal; and a detected signal of the grating diffracted light is defined as a signal for servo controlling.

15 Claims, 26 Drawing Sheets

(a) DURING RECORDING AND REPRODUCING OPERATIONS OF L0 LAYER (b) DURING RECORDING AND REPRODUCING OPERATIONS OF L1 LAYER (a) DURING RECORDING AND REPRODUCING OPERATIONS OF L0 LAYER (b) DURING RECORDING AND REPRODUCING OPERATIONS OF L1 LAYER

OPTICAL PICKUP DEVICE AND OPTICAL DISC APPARATUS

INCORPORATION BY REFERENCE

The present application claims priority from Japanese application JP-2010-041267 filed on Feb. 26, 2010, the content of which is hereby incorporated by reference into this application.

BACKGROUND OF THE INVENTION

The present invention relates to an optical pickup device and an optical disc apparatus.

As a background art of this technical field, for example, there is JP-A-2006-344344 which describes an object "to precisely obtain desired signals from an optical disk having a plurality of recording layers", and discloses a solution as follows: "an optical beam of P-polarized light emitted from a light source unit 51 is reflected by an optical disc 15 and becomes S-polarized light to enter a lens 61. Then, both of quarter wave plates 62 and 63 impart an optical phase difference of a +quarter wavelength to the optical beam having entered an +X side of an optical axis, and impart an optical phase difference of a −quarter wavelength to the optical beam having entered the −X side. Thus, signal light through the quarter wave plate 63 becomes S-polarized light, and stray light becomes P-polarized light, so that a polarization optical element 64 transmits only the signal light."

Further, in JP-A-2009-170060, there is described "it is an object to provide an optical pickup device capable of providing stable servo signals by preventing the influence of stray light from other layers on a focusing error signal and tracking error signal during recording and reproducing operations in a multilayer optical disc." A solution is disclosed as follows: "reflected light from the multilayer optical disc is divided into a plurality of regions, divided luminous fluxes are focused on different positions of a photodetector, the focusing error signal is detected by a knife edge method using a plurality of the divided luminous fluxes, and the tracking error signal is detected by using the plurality of divided luminous fluxes". Further, "when a focus is on an intended layer, the divided region of a luminous flux and a light receiving surface are arranged so as to prevent incidence of stray light from the other layers to a light receiving surface for the servo signal of the photodetector."

SUMMARY OF THE INVENTION

An optical pickup device correctly irradiates an optical spot on a predetermined recording track which is generally present within an optical disc and therefore, detects a focusing error signal and displaces an objective lens in a focus direction to perform an adjustment in the focus direction. In addition, the optical pickup device detects a tracking error signal and displaces the objective lens in a radius direction of the optical disc to perform a tracking adjustment. The optical pickup device performs a position control of the objective lens using these servo signals.

There is a significant problem as to the tracking error signal among the above-described servo signals that a multilayer disc in which a plurality of recording layers are present are used. In the multilayer disc, in addition to signal light reflected by the intended recording layer, stray light reflected by a plurality of unintended recording layers enters the same light receiving part. When the signal light and the stray light enter the light receiving part, both of optical beams interfere, and as a result, its fluctuating component is detected in the tracking error signal.

To cope with the above-described problem, the optical pickup device disclosed in JP-A-2006-344344 has a construction in which an optical beam reflected by the optical disc is focused by a condenser lens; the focused optical beam passes through two sheets of the quarter wave plates and a polarization optical element and further, a widened optical beam is focused by the condenser lens, and as a result, stray light is prevented from entering a photodetector. Therefore, there is a problem that the construction of the optical detecting system becomes complex, and a size of the optical pickup device becomes large.

Further, the optical pickup device disclosed in JP-A-2009-170060 has a construction in which, since a reproduced signal is detected using a plurality of light receiving parts on the photodetector, noises generated at the time of converting light into electric signals are added to the reproduced signal. Therefore, there is a problem of reducing the noise of the reproduced signal, that is, improving a signal-to-noise ratio.

It is an object to provide an optical pickup device capable of reducing the noise of the reproduced signal, acquiring stable servo signals, and miniaturizing than ever before in such a case that an information recording medium having a plurality of information recording layers is recorded or reproduced, and also to provide optical disc apparatus on which the above-described optical pickup device is mounted.

The above-described object can be achieved by the present invention disclosed in the scope of claims.

According to an aspect of the present invention, there is provided an optical pickup device capable of reducing the noise of the reproduced signal, acquiring stable servo signals, and miniaturizing than ever before in such case that the information recording medium having the plurality of information recording layers is recorded or reproduced, and also there is provided optical disc apparatus on which the above-described optical pickup device is mounted.

Other objects, features and advantages of the invention will become apparent from the following description of the embodiments of the invention taken in conjunction with the accompanying drawings.

BRIEF DESCRIPTION OF THE DRAWINGS

FIGS. 23A to 23D illustrate other light receiving parts in a different array, respectively, in the fourth embodiment of the present invention.

DETAILED DESCRIPTION OF THE EMBODIMENTS

Hereinafter, preferred embodiments of the present invention will be described with reference to the accompanying drawings of the embodiments.

First Embodiment

Figure 1:
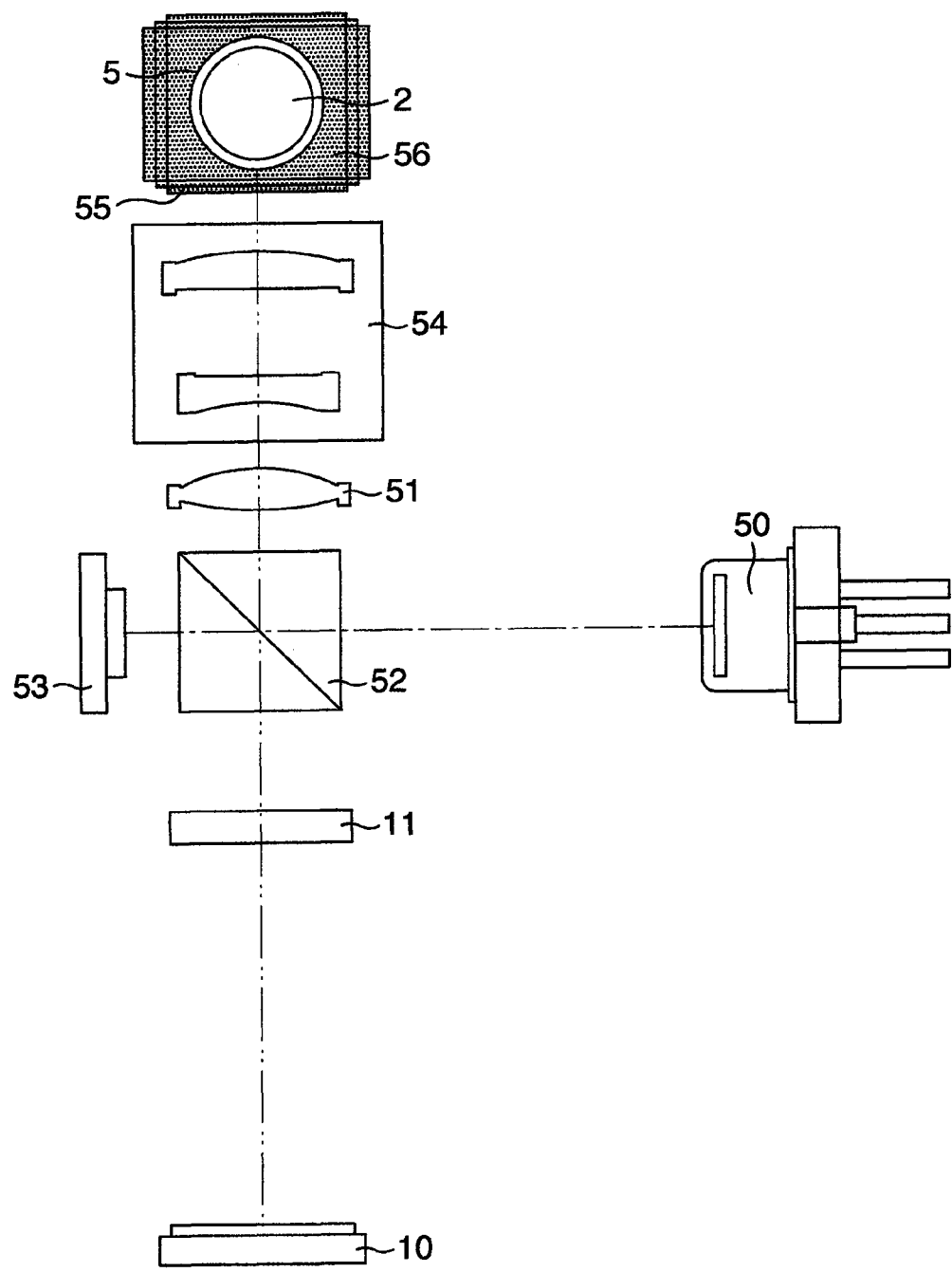
FIG. 1 illustrates an optical system according to a first embodiment of the present invention.

FIG. 1 illustrates an optical system of an optical pickup device according to a first embodiment of the present invention. Here, although a BD (Blu-ray Disc) will be described, a DVD (Digital Versatile Disc) or other recording systems may be optionally applicable. Note that layers of an optical disc include a recording layer of a recording optical disc and a reproducing layer of a reproduction-only optical disc in the following description.

An optical beam having a wavelength of approximately 405 nm is emitted from a laser diode 50 as divergent light. The optical beam emitted from the laser diode 50 is reflected by a beam splitter 52. Note that a portion of the optical beam passes through the beam splitter 52 and then enters a front monitor 53. Generally, in such a case that information is recorded on the recording type optical disc, the light amount of the laser diode is required to be controlled with a high degree of accuracy in order that a predetermined light amount of the laser diode may be irradiated onto the information recording surface (recording layer) of the recording type optical disc. To this end, when a signal is recorded on the recording type optical disc, the front monitor 53 detects a change in the light amount of the laser diode 50 and feeds back the detected light change amount to a driving circuit (not illustrated) of the laser diode 50. As a result, the front monitor 53 can monitor the light amount on the optical disc.

The optical beam reflected by the beam splitter 52 is converted into a substantially parallel optical beam by a collimating lens 51. The optical beam that passed through the collimating lens 51 enters a beam expander 54. The beam expander 54 is utilized in order to compensate spherical aberration due to a thickness error of a cover layer of the optical disc, by changing the divergent/convergent state of an optical beam. The optical beam emitted from the beam expander 54 is reflected by a reflection mirror 55 and passes through a quarter wave plate 56. Then, the optical beam is focused on the optical disc by an objective lens 2 mounted on an actuator 5.

The optical beam reflected by the optical disc passes through the objective lens 2, the quarter wave plate 56, the reflection mirror 55, the beam expander 54, the collimating lens 51, and the beam splitter 52, and then enters a grating 11. The entered optical beam is divided into a plurality of regions by the grating 11 and the divided optical beams travel along directions that are different from each other with respect to these plural regions and are focused on a photodetector 10. While a plurality of light receiving parts have been formed on the photodetector 10, the plurality of optical beams divided by the grating 11 are irradiated onto the respective light receiving parts. Electric signals are output from the photodetector 10 in response to the light amount of the optical beams irradiated on the light receiving parts, and these output electric signals are calculated so as to generate an RF signal, a focusing error signal, and a tracking error signal as reproduction signals.

Detection of the tracking error signal will be described here. As a general method for detecting the tracking error signal, a 3-beam differential push pull method (DPP: Differential Push Pull method) for irradiating three optical beams on an optical disc is known. According to this 3-beam DPP method, an optical beam is divided by the grating 11 into a main beam, a sub beam +first order diffracted light, and a sub beam −first order diffracted light, and forms three spots on the optical disc. At this time, disc reflected light from three spots is detected, and a main push pull (MPP) signal obtained from a main beam and sub push pull (SPP) signals obtained from the sub beam +first order diffracted light and the sub beam −first order diffracted light are calculated as follows to detect a 3-beam DPP signal subtracted with a DC component accompanied by the displacement of an objective lens.

$$DPP = MPP - k \times SPP \quad \text{[Equation 1]}$$

Note that a symbol "k" is a coefficient for correcting a light amount ratio between the main beam and the sub beams.

However, as to the 3-beam DPP system, a problem occurs at the time of recording and reproducing operations of an optical disc having recording layers of two layers or more. The above-described problem will be described using a simplest dual layer disc. The dual layer disc is an optical disc with two recording layers, and an optical beam is reflected by each recording layer. Therefore, in the dual layer disc, an optical beam is separated into two parts by the optical disc and each separated part enters the photodetector through two optical paths. For example, when focusing one layer, the optical beam forms a spot (signal light) on a surface of the photodetector and an optical beam (stray light) reflected by the other layer enters the photodetector in an indistinct state. At this time, the signal light and the stray light reflected by respective layers overlap each other on the photodetector, and interference occurs. Fundamentally, optical beams emitted from a laser diode with the same frequency do not change in time. However, since a distance between the layers changes due to a rotation of the optical disc, a phase relationship between two optical beams changes with time, and variation of the DPP signal serving as the tracking error signal is caused. This variation of the 3-beam DPP signal is mainly caused by the SPP signal. The reason is as follows. The light amount ratio of the main beam (zero-th order diffracted light), the sub beam +first order diffracted light, and the sub beam −first order diffracted light is generally from 10:1:1 to 20:1:1, and the light amount of the sub beam is small as compared with that of the main beam. Therefore, interference between the signal light of the sub beam and the stray light of the main beam largely occurs with respect to the signal light. This permits the SPP signal to largely change, and as a result, the 3-beam DPP signal as the tracking error signal largely changes. When the variation of the tracking error signal occurs, a spot on the optical disc fails to follow along a track, and there mainly occurs the problem of performance degradation of the recording and reproducing operations.

To cope with the above-described problem, in JP-A-2006-344344, an optical pickup device has a construction in which an optical beam reflected by the optical disc is focused by a condenser lens and an optical beam spread by passing through two sheets of quarter wave plates, and a polarization optical element is focused by a condenser lens, so that the stray light is prevented from entering the photodetector. Therefore, there is a problem that the detection optical system becomes complicated and the size of the optical pickup device increases.

As compared with the above-described optical pickup device, the optical pickup device according to the present embodiment has an extremely simple optical system as illustrated in FIG. 1, and therefore, can be miniaturized. Hereinafter, the optical pickup device according to the present embodiment will be described.

Figure 2:
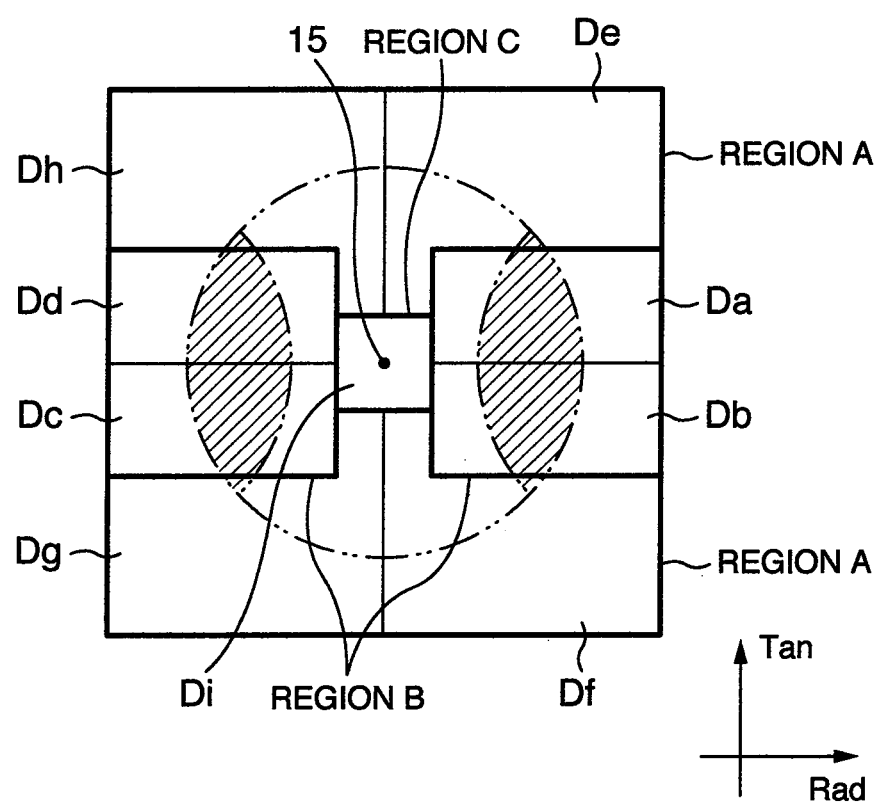
FIG. 2 illustrates a grating according to the first embodiment of the present invention.
Figure 3:
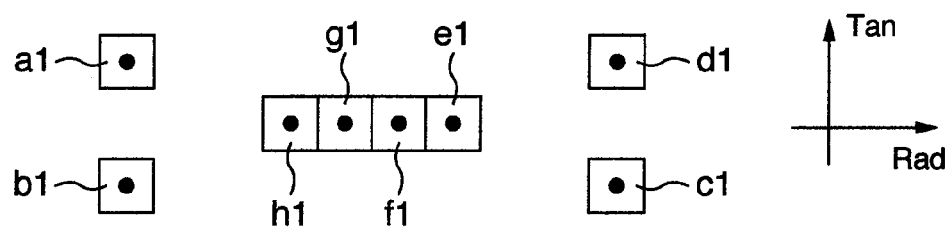
FIG. 3 illustrates light receiving parts according to the first embodiment of the present invention.
Figure 3:
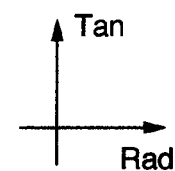
Figure 3:
Figure 3:
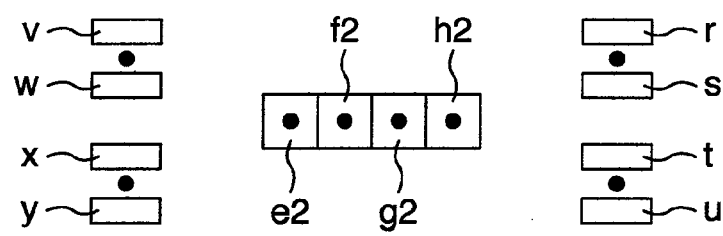

FIG. 2 illustrates a shape of the grating 11 according to the present embodiment. A solid line illustrates a boundary line of regions, a chain double-dashed line illustrates an outer shape of an optical beam, and a hatched portion illustrates an interference region (push-pull pattern) between zero-th order disc diffracted light and ±first order disc diffracted light of diffracted light (hereinafter, referred to as "disc diffracted light") diffracted by the tracks of the optical disc. The grating 11 is formed by regions "De", "Df", "Dg", and "Dh" (region "A") to which only the zero-th order disc diffracted light of the disc diffracted light diffracted by the tracks on the optical disc enters; regions "Da", "Db", "Dc", and "Dd" (region "B") to which the zero-th order disc diffracted light and the ±first order disc diffracted light of the disc diffracted light enters; and also, a region "Di" (region "C"). The photodetector 10 has a pattern as illustrated in FIG. 3. Note that black points indicate the zero-th order grating diffracted light and ±first order grating diffracted light of the diffracted light (hereinafter, referred to as "grating diffracted light") diffracted by the grating 11 in the drawing. Suppose that a spectral ratio of the grating 11 is, for example, the zero-th order grating diffracted light: the +first order grating diffracted light: the −first order grating diffracted light=10:1:1.

In this case, the zero-th order grating diffracted light diffracted by the regions Da, Db, Dc, Dd, De, Df, Dg, Dh, and Di of the grating 11 enters a light receiving part j of the photodetector illustrated in FIG. 3. Further, the +first order grating diffracted light diffracted by the regions Da, Db, Dc, Dd, De, Df, Dg, and Dh of the grating 11 enters the light receiving parts a1, b1, c1, d1, e1, f1, g1, and h1, respectively. Further, the −first order grating diffracted light diffracted by the regions Da, Db, Dc, and Dd enters the light receiving parts r, s, t, u, v, w, x and y for detecting a focusing error signal, respectively, whereas the −first order grating diffracted light diffracted by the regions De, Df, Dg, and Dh enters the light receiving parts e2, f2, g2, and h2, respectively. Signals J0, A1, B1, C1, D1, E1, F1, G1, H1, E2, F2, G2, H2, R, S, T, U, V, W, X, and Y obtained from the light receiving parts j, a1, b1, c1, d1, e1, f1, g1, h1, e2, f2, g2, h2, r, s, t, u, v, w, x, and y, are processed based upon the below-mentioned calculations in order to generate a focusing error signal (FES), a tracking error signal (TES), and an RF signal (RF).

$$FES = (S + T + W + X) - (R + U + V + Y) \quad \text{[Equation 2]}$$

$$TES = [\{(A1 + E1) + (B1 + F1)\} - \{(C1 + G1) + (D1 + H1)\}] - kt \times \{(E2 + F2) - (G2 + H2)\}$$

$$RF = J0$$

Note that a symbol kt is a coefficient so as not to generate a DC component in the tracking error signal when the objective lens is displaced. In this case, for example, the knife edge method is used as the focus error detection method.

Since an RF signal is generated from the signal J0 obtained from one light receiving part j on the photodetector, the above-described method exerts an effect of reducing noises generated at the time of converting light into the electric signal as compared with the method in which an RF signal is generated from a signal obtained from a plurality of light receiving parts on the photodetector as disclosed in, for example, JP-A-2009-170060. Hereinafter, an embodiment for avoiding multilayer stray light in this method will be described in detail.

Figure 4:
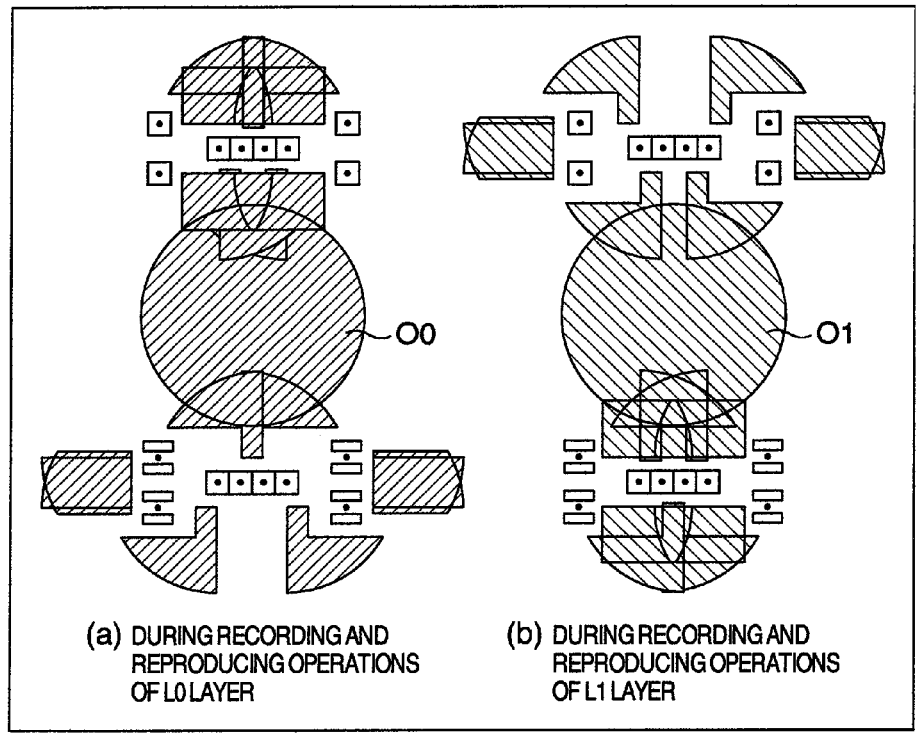
FIG. 4 illustrates a shape (on a photodetector) of stray light at the time when recorded on or reproduced from a dual layer disc in the first embodiment of the present invention.

FIG. 4 illustrates a relationship between signal light and stray light from other layers during recording and reproducing operations of the dual layer disc. FIG. 4 (a) illustrates a relationship between the signal light and the stray light from the other layers during recording and reproducing operations of an L0 layer, and FIG. 4 (b) illustrates a relationship between the signal light and the stray light from other layers during recording and reproducing operations of an L1 layer. Here, one stray light O0 and another stray light O1 indicate the zero-th order grating diffracted light of stray light from the other layers of the L0 layer and the L1 layer, respectively. As can be seen from FIG. 4, the signal light and the stray light from the other layers do not overlap each other on the light receiving part except for the zero-th order grating diffracted light of the grating 11. The signal J0 detected from the light receiving part j is not used for detecting the tracking error signal, but used for a reproduction signal. Therefore, even if the stray light is present, there is no problem from a practical standpoint.

From FIG. 4, since the stray light from the other layers is prevented from entering the light receiving part for detecting the tracking error signal, interference between the signal light and the stray light does not occur. Therefore, the optical pickup device can detect stable tracking error signals. Further, the optical pickup device according to the present embodiment has a construction in which even if the objective lens is displaced, the stray light is hard to enter the light receiving part.

When the signals are actually detected, the object lens records or reproduces the signals along with following the tracks formed on an optical disc, so that the objective lens is displaced in a Rad direction. Therefore, in the case of using the normal pattern of the light receiving part of the photodetector, there is a possibility that when the objective lens is displaced, the stray light from the other layers enters the light receiving part. In contrast to the above-explained general situation, the optical pickup device according to the present embodiment, the light receiving parts of the photodetector 10 are optimized with respect to the patterns of the grating 11, so that an allowable amount of the displacement of the objective lens can be increased. In this case, the matter which should be considered is how the signal light is separated from the stray light with respect to the displacement direction of the objective lens.

Figure 5:
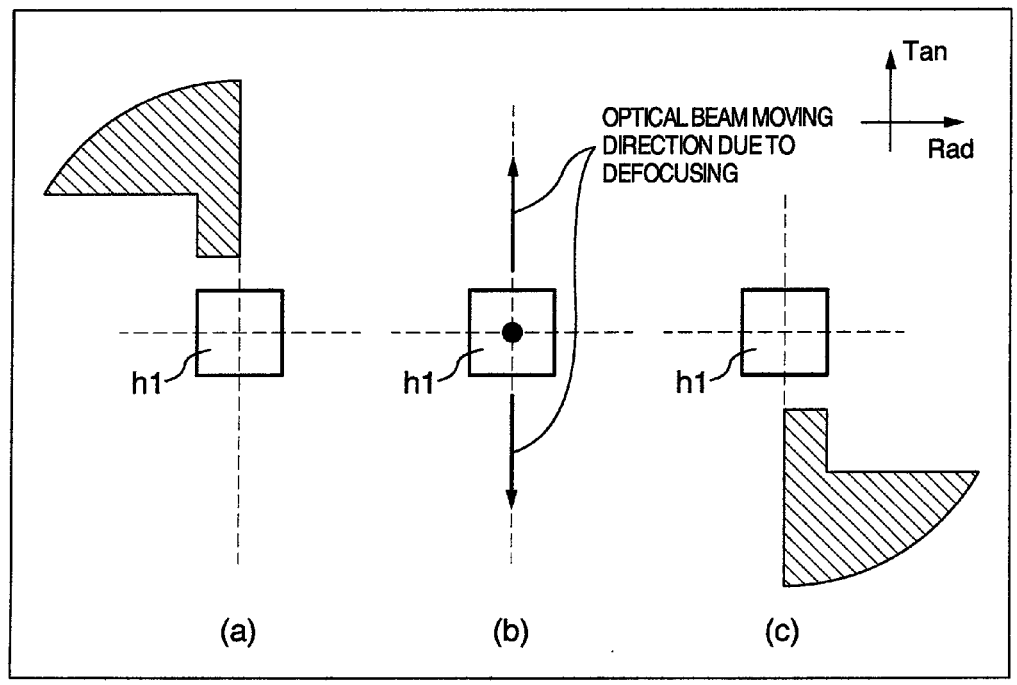
FIG. 5 illustrates a behavior of the stray light from other layers of the dual layer disc.
Figure 6:
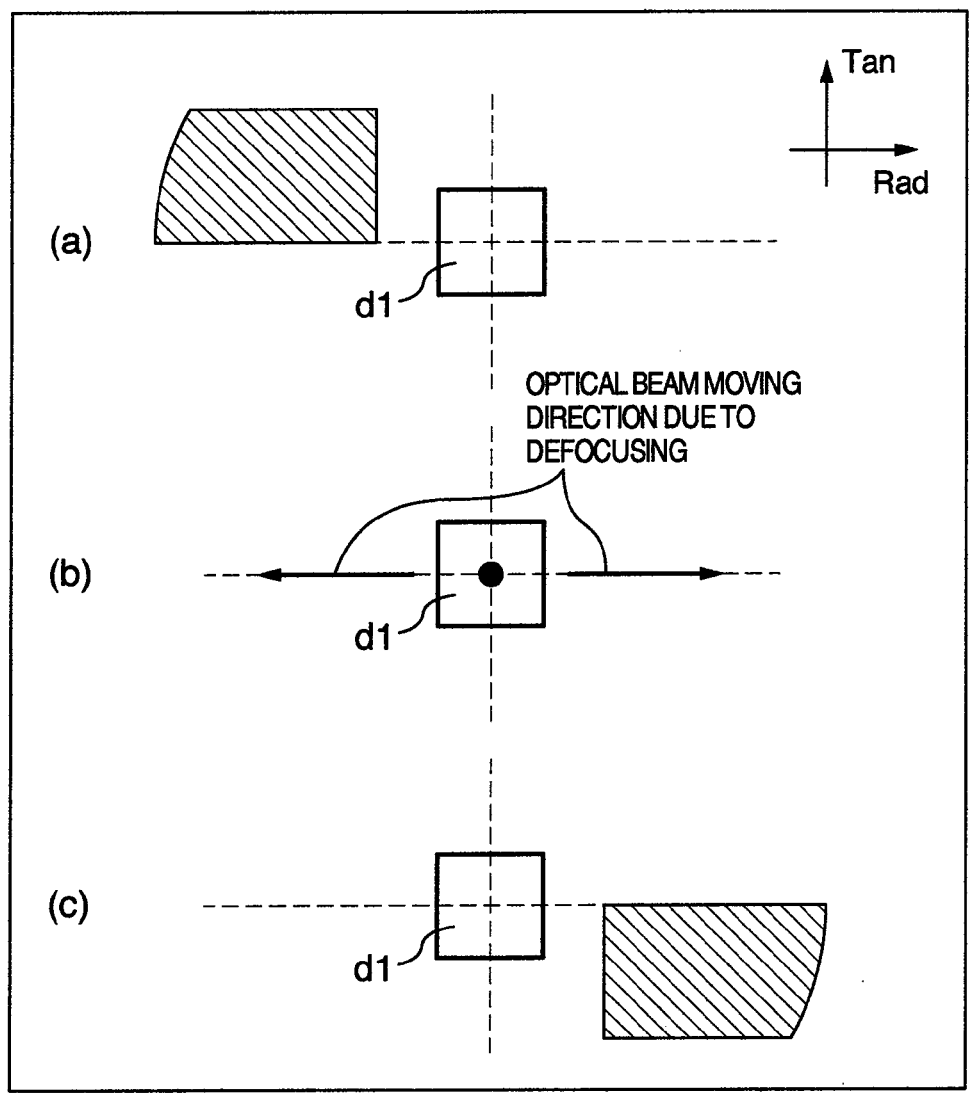
FIG. 6 illustrates a behavior of the stray light from other layers of the dual layer disc.

FIG. 5 illustrates an optical beam which has been diffracted by the region Dh of the grating 11 and then has entered the light receiving part h1, and FIG. 6 illustrates an optical beam which has been diffracted by the region Dd of the grating 11 and then has entered the light receiving part d1. (a), (b), and (c) have been divided depending upon states of optical spots on an optical disc. (b) illustrates a state under which the optical beams are focused on the optical discs, whereas (a) and (c) illustrate states under which the optical beams are defocused by the objective lens. In addition, in (a) and (c), the direction in which the optical beams are defocused by the objective lens is different from each other. Note that a relationship among the symbols (a) to (c) does not substantially depend upon the positions of the light receiving parts. The reason why the defocused states are described is that it can be interpreted that the stray light emitted from the dual layer disc corresponds to the defocused light reflected by such a position which is not a focal position.

When the optical beam states illustrated in FIG. 5 are compared with those illustrated in FIG. 6, it can be understood that optical beam moving directions are different from each other due to defocusing. The optical beam diffracted by the region Dh of FIG. 5 moves along a track direction (will be referred to as Tan direction hereinafter) of the optical disc by being defocused. In contrast thereto, the optical beam diffracted by the region Dd of FIG. 6 moves along the radial direction (Rad direction). The reason is that since the optical beams are blurred in a point symmetrical manner with respect to a center 15 of the optical beams on the grating 11, the optical beam moving directions due to the defocusing depending on the regions are different from each other. As a result, it becomes important that how to avoid the stray light are classified depending upon the regions. In such a case that regions of the grating 11 have been separated along the Tan direction with respect to the optical beam center 15 (namely, regions Dh, De, Df, Dg (region A)), it is desirable to avoid the stray light along the Tan direction. By avoiding the stray light in the above-described manner, even when the objective lens displaces along the Rad direction, this stray light is prevented from entering the photodetector. As a consequence, the light receiving parts for detecting the optical beams diffracted by the regions Dh, De, Df, Dg of the grating 11 are arranged along the Rad direction, so that adverse influences caused by the stray light diffracted by the other regions can be suppressed to a minimum effect.

Also, in such a case that regions of the grating 11 have been separated along the Rad direction with respect to the optical beam center 15 (namely, regions Da, Db, Dc, and Dd (region B)), it is desirable to avoid the stray light along the Rad direction. As a consequence, the light receiving parts for detecting the optical beams diffracted by the regions Da, Db, Dc, Dd of the grating 11 are arrayed along the Tan direction, so that adverse influences caused by the stray light diffracted by the other regions can be suppressed to a minimum effect.

As described above, when the light receiving parts are arranged as illustrated in FIG. 3, the signal light and the stray light can be effectively separated from each other. Therefore, the photodetector 10 can detect the stable tracking error signal.

Further, by performing the detection of the RF signals by one light receiving part as described above, noises generated at the time of converting light into electric signals can be reduced, so that this construction is extremely advantageous from the viewpoint of the improvement in the signal-to-noise ratio of reproduction signals in the multilayer disc.

Figure 7A:
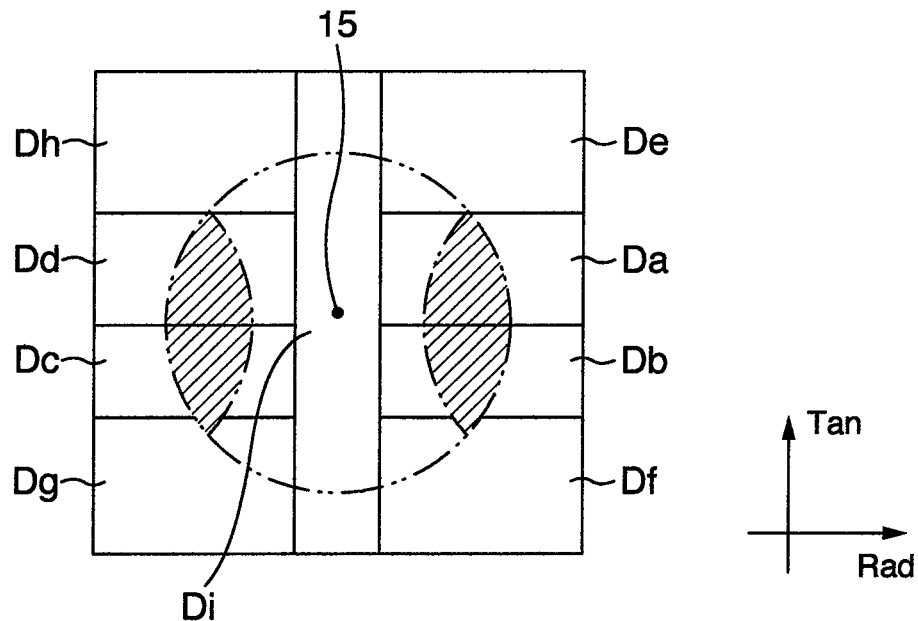
FIGS. 7A and 7B illustrate other gratings in the first embodiment of the present invention.
Figure 7B:
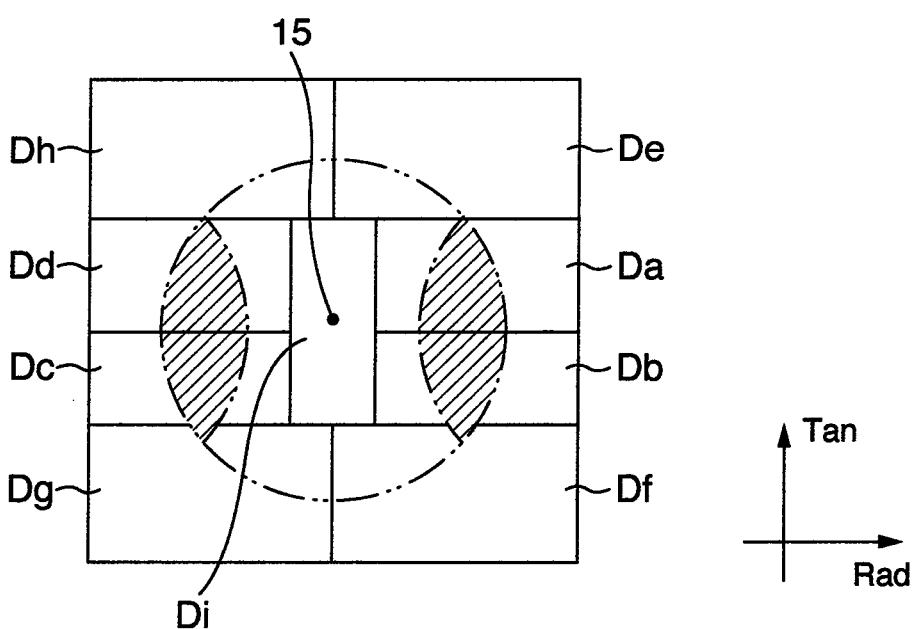
Figure 8:
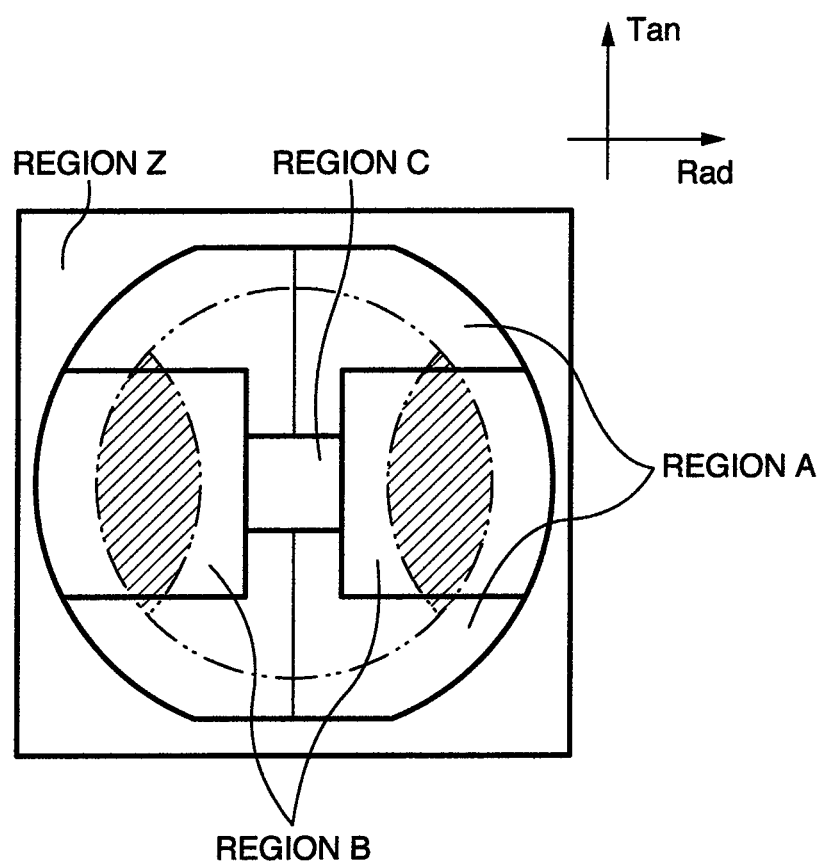
FIG. 8 illustrates another grating in the first embodiment of the present invention.
Figure 9:
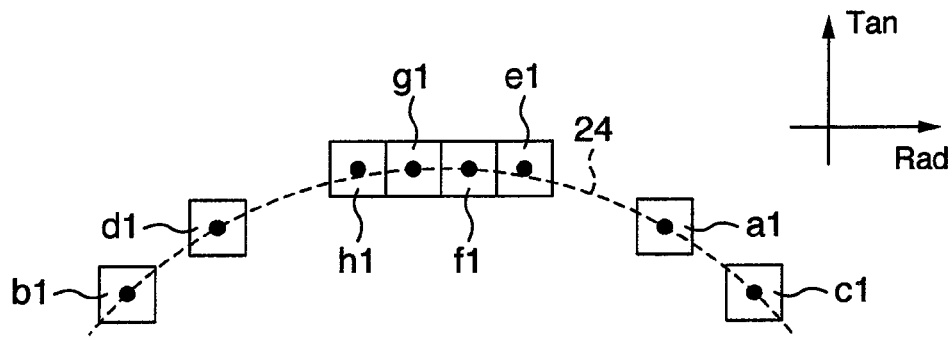
FIG. 9 illustrates other light receiving parts in a different array in the first embodiment of the present invention.
Figure 9:
Figure 9:
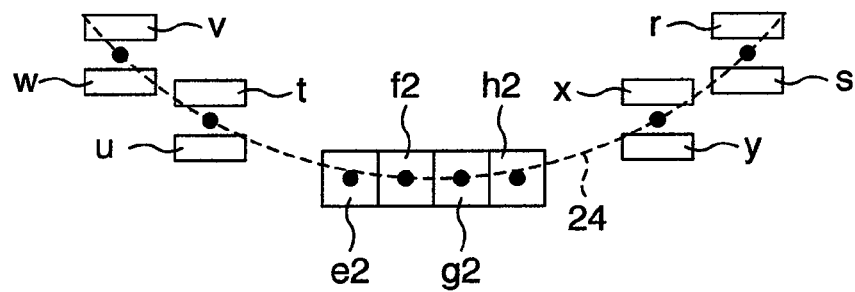

According to the present embodiment, the grating 11 is described with reference to FIG. 2, however, it is not limited thereto. For example, even if the patterns as illustrated in FIGS. 7A and 7B are used, a similar effect can be obtained. Further, for the purpose of eliminating the stray light except within an effective diameter of the signal light on the grating 11, if a region Z is formed on the grating 11 as illustrated in FIG. 8, a similar effect can be obtained. In this case, the grating 11 has a construction such that light entering the region Z is prevented from entering the light receiving parts. The region Z may be made by a grating structure, a multilayer-film mirror, or a filter. Moreover, in the first embodiment, the grating 11 was arranged at the position after the optical beam has passed through the beam splitter 52. Alternatively, along with replacing the grating 11 by a polarizing diffracted grating, if the polarizing diffracted grating may be arrayed at a position before the optical beam passes through the beam splitter 52, a similar effect can be obtained. Also, although the optical disc having two layers has been described in the first embodiment, even when such optical discs having three or more layers are used, a similar effect can be obtained. In addition, as apparent from the foregoing description, there is no limitation as to the spherical aberration compensation method. The arrangement of the light receiving parts according to the present embodiment is one example. If the zero-th order grating diffracted light of the grating 11 with a large light amount is detected using one light receiving part and the light receiving parts for the ±first order grating diffracted light diffracted by the grating 11 or those for the grating diffracted light with the order larger than the first order are arranged so as to avoid the stray light of the zero-th order grating diffracted light, a similar effect can be obtained. Further, if the stray light of the regions in the Rad direction with respect to the grating center is separated from each other in the Rad direction, while if the stray light of the regions in the Tan direction with respect to the grating center is separated from each other in the Tan direction, it goes without saying that a similar effect can be obtained. For example, even if the light receiving parts e1, f1, g1, and h1 (the light receiving parts e2, f2, g2, and h2) are arrayed in the Rad direction as illustrated in FIG. 9 for the optical beams diffracted by the regions Dh, De, Df, and Dg (region A) the regions of which on the grating 11 is separated from each other in the Tan direction, it goes without saying that a similar effect can be obtained. In addition, the light receiving parts a1, b1, c1, d1, e1, f1, g1, and h1, the light receiving part for detecting the focus signal, and the light receiving parts e2, f2, g2, and h2 may be arrayed so as to form an approximately circular shape with respect to the zero-th order grating diffracted light as illustrated in a dotted line 24 of FIG. 9.

Figure 10:
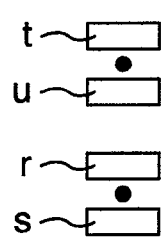
FIG. 10 illustrates other light receiving parts in a different array in the first embodiment of the present invention.
Figure 10:
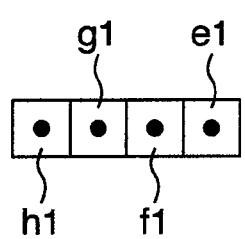
Figure 10:
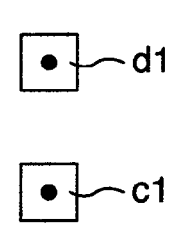
Figure 10:
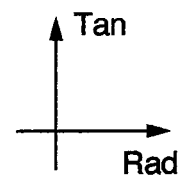
Figure 10:
Figure 10:
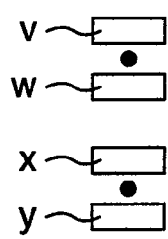
Figure 10:
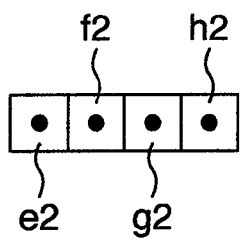
Figure 10:
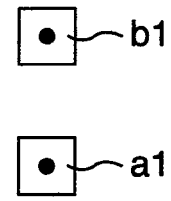

The optical pickup device according to the present embodiment is characterized by a construction in which the stray light is prevented from entering the light receiving parts, and does not depend upon the methods for detection and the calculations of the focusing error signal and the tracking error signal. Therefore, even if the +first order grating diffracted light is replaced by the −first order grating diffracted light in the light receiving part for detecting the focusing error signal, for example, as illustrated in FIG. 10, a similar effect may be obtained. Further, there is no need for both of the light receiving parts to be contacted with each other. Although, in the present embodiment, the +first order grating diffracted light and the −first order grating diffracted light of the region Di were not specified, for example, the +first order grating diffracted light and the −first order grating diffracted light may be diffracted in the Rad direction, and signals for adjustment and other servo signals such as a spherical aberration error signal may be detected by using them. Furthermore, output signals from the optical pickup device may be reduced by connecting the light receiving parts by wires.

Second Embodiment

Figure 11:
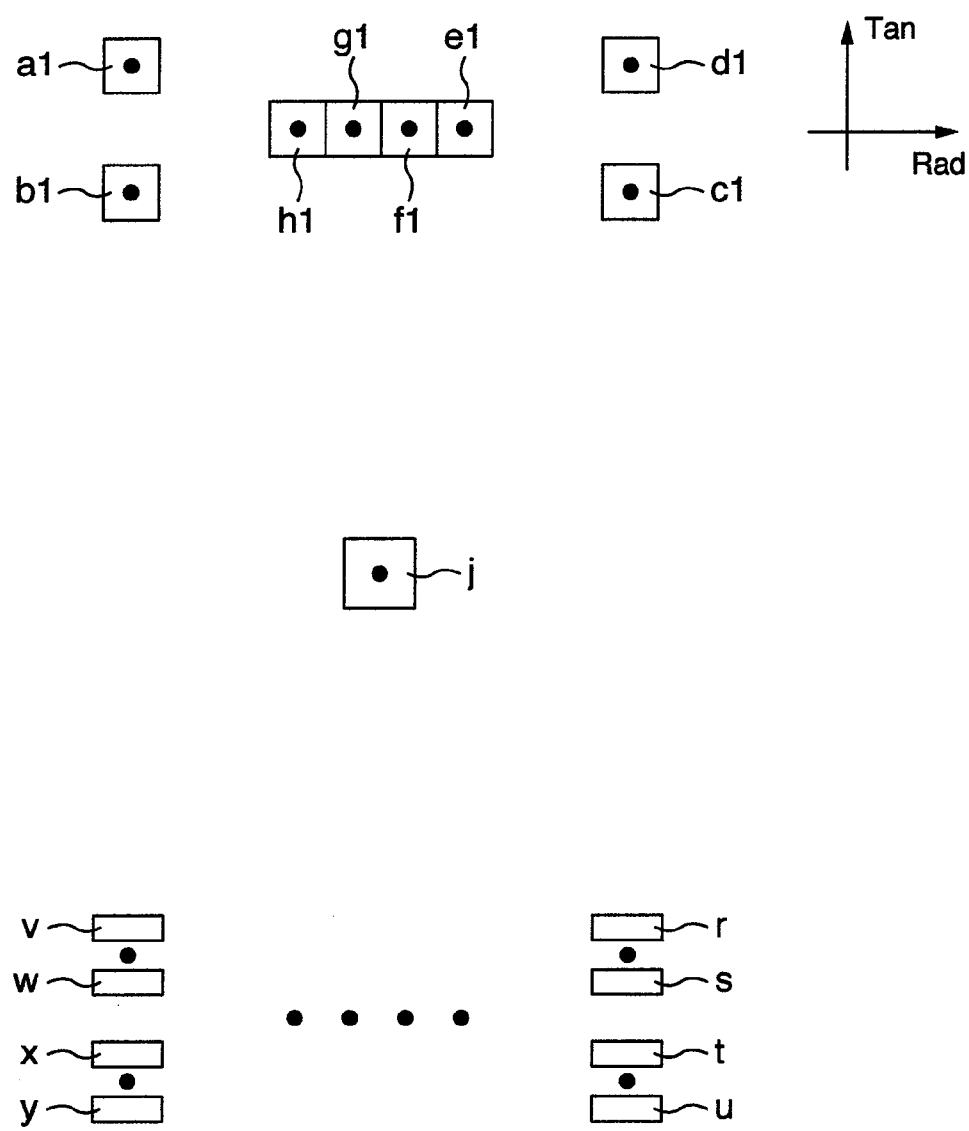
FIG. 11 illustrates other light receiving parts according to a second embodiment of the present invention.

FIG. 11 illustrates light receiving parts of a photodetector of an optical pickup device according to a second embodiment of the present invention. A structural difference from the first embodiment is the photodetector 10 and the other structural elements of the second embodiment are similar to those of the first embodiment.

The grating 11 illustrated in FIG. 2 is formed by the regions De, Df, Dg, and Dh (region A) entered by only the zero-th order disc diffracted light of the disc diffracted light diffracted by the tracks on the optical disc, the regions Da, Db, Dc, and Dd (region B) entered by the zero-th order disc diffracted light and the ±first order disc diffracted light of the disc diffracted light, and the region Di (region C).

Suppose that a spectral ratio of the grating 11 is, for example, the zero-th order grating diffracted light: the +first order grating diffracted light: the −first order grating diffracted light=10:1:1. The photodetector 10 has a pattern as illustrated in FIG. 11. In the drawing, black points illustrate the zero-th order grating diffracted light and the ±first order grating diffracted light diffracted by the grating. In this case, the zero-th order grating diffracted light diffracted by the regions Da, Db, Dc, Dd, De, Df, Dg, Dh, and Di of the grating 11 enters the light receiving part j of the photodetector illustrated in FIG. 11. Further, the +first order grating diffracted light diffracted by the regions Da, Db, Dc, Dd, De, Df, Dg, and Dh of the grating 11 enters the light receiving parts a1, b1, c1, d1, e1, f1, g1, and h1, respectively. Further, the −first order grating diffracted light diffracted by the regions Da, Db, Dc, and Dd enters the light receiving parts r, s, t, u, v, w, x, and y for detecting a focusing error signal, respectively. Here, the −first order grating diffracted light diffracted by the regions De, Df, Dg, and Dh is prevented from entering the light receiving parts, respectively.

Signals J0, A1, B1, C1, D1, E1, F1, G1, H1, R, S, T, U, V, W, X, and Y obtained from the light receiving parts j, a1, b1, c1, d1, e1, f1, g1, h1, r, s, t, u, v, w, x, and y are calculated as follows to generate the focusing error signal (FES), the tracking error signal (TES), and the RF signal (RF).

FES=(S+T+W+X)−(R+U+V+Y)

TES=[(A1+B1)−(C1+D1)]−kt×[(E1+F1)+(G1+H1)]

RF=J0     [Equation 3]

Note that a symbol kt is a coefficient used so as not to generate a DC component in the tracking error signal when the objective lens is displaced. In this case, for example, the knife edge method is used as the focus error detection method. Since optical spots are arranged on the photodetector in the same manner as in the first embodiment, the stray light from the other layers during the recording and reproducing operations of the dual layer disc is prevented from entering the light receiving parts except for the zero-th order grating diffracted light of the grating 11. Note, however, that the signal J0 detected from the light receiving part j is not used for detecting the tracking error signal, but used for a reproduction signal. Therefore, even if the stray light is present, there is no problem from a practical standpoint.

Also as described in the first embodiment, in such a case that regions of the grating 11 are separated along the Tan direction with respect to the optical beam center 15 (namely, regions Dh, De, Df, and Dg (region A), it is desirable that the stray light is avoided along the Tan direction. Therefore, by avoiding the stray light along the Tan direction as in the light receiving parts e1, f1, g1, and h1 in FIG. 11, the stray light is prevented from entering the light receiving parts, even if the objective lens is displaced in the Rad direction.

In such a case that regions of the grating 11 have been separated along the Rad direction with respect to the optical beam center 15 (namely, regions Da, Db, Dc, Dd (region B), it is desirable to avoid the stray light along the Rad direction. Therefore, by avoiding the stray light along the Rad direction as in the light receiving parts a1 and b1, and c1 and d1 in FIG. 11, adverse influences caused by the stray light diffracted by the other regions can be suppressed to a minimum effect.

As described above, when the light receiving parts are arranged as illustrated in FIG. 11, the photodetector 10 can effectively separate the signal light from the stray light. Therefore, the photodetector 10 can detect stable tracking error signals. Further, when the detection of RF signals is performed by one light receiving part as described above, noises generated at the time of converting light into electric signals can be reduced, so that the above-described construction is extremely advantageous from the viewpoint of the improvement in the signal-to-noise ratio of reproduction signals in the multilayer disc.

Figure 12:
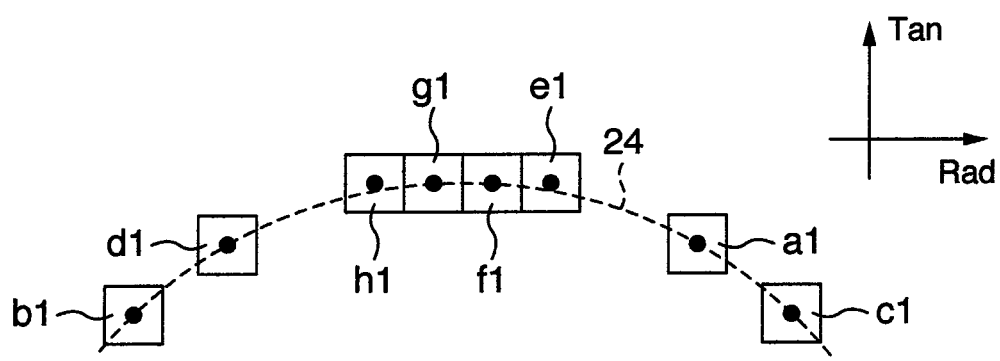
FIG. 12 illustrates other light receiving parts in a different array in the second embodiment of the present invention.
Figure 12:
Figure 12:
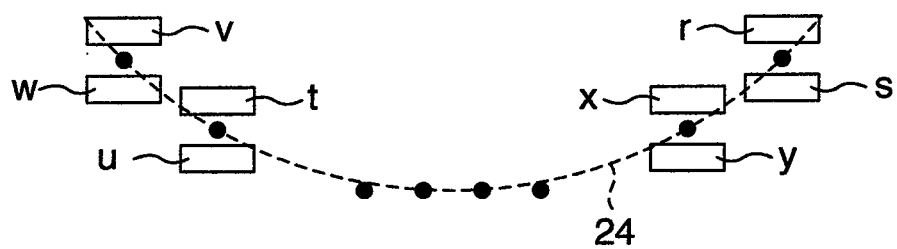

According to the present embodiment, the grating 11 is described with reference to FIG. 2, however, it is not limited thereto. For example, even if the grating 11 has a pattern as illustrated in FIGS. 7A and 7B, a similar effect can be obtained. Further, for the purpose of eliminating the stray light except within an effective diameter of the signal light on the grating 11, if a region Z is formed on the grating 11 as illustrated in FIG. 8, a similar effect can be obtained. At this time, the grating 11 has a construction in which light that enters the region Z is prevented from entering the light receiving parts. The region Z may be made by a grating structure, a multilayer-film mirror, or a filter. Moreover, in the present embodiment, the grating 11 has been arranged at the position after the optical beam has passed through the beam splitter 52. Alternatively, along with replacing the grating 11 by a polarization diffracted grating, if the polarization diffracted grating may be arrayed at a position before the optical beam passes through the beam splitter 52, it goes without saying that a similar effect can be obtained. Also, although the optical disc having two layers has been described in the present embodiment, even when such optical discs having three or more layers may be used, a similar effect can be obtained. In addition, as apparent from the foregoing description, there is no limitation as to the spherical aberration compensation method. The arrangement of the light receiving parts according to the present embodiment is one example. If the zero-th order grating diffracted light of the grating with a large light amount is detected using one light receiving part and the light receiving parts for the ±first order grating diffracted light diffracted by the grating 11 or those for the grating diffracted light with the order larger than the first order are arranged so as to avoid the stray light of its zero-th order grating diffracted light, a similar effect can be obtained. Further, if the stray light of the regions in the Rad direction with respect to the grating center is separated from each other in the Rad direction, while the stray light of the regions in the Tan direction with respect to the grating center is separated from each other in the Tan direction, a similar effect can be obtained. For example, even if the light receiving parts e1, f1, g1, and h1 are arrayed in the Rad direction as illustrated in FIG. 12 for the optical beams diffracted by the regions Dh, De, Df, and Dg (region A) the regions of which on the grating are separated from each other in the Tan direction, a similar effect can be obtained. In addition, the light receiving parts a1, b1, c1, d1, e1, f1, g1, and h1, and the light receiving part for detecting the focus signal may be arrayed so as to form an approximately circular shape with respect to the zero-th order grating diffracted light as illustrated in a dotted line 24 of FIG. 12.

Figure 13A:
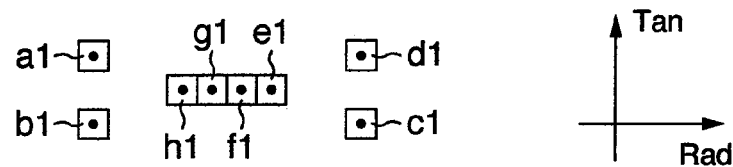
FIGS. 13A and 13B illustrate other light receiving parts in a different array, respectively, in the second embodiment of the present invention.
Figure 13A:
Figure 13A:
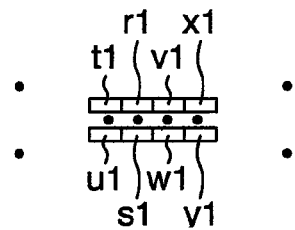
Figure 13B:
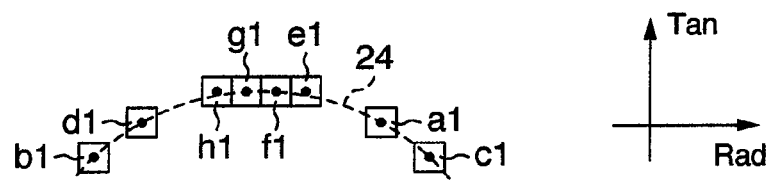
Figure 13B:
Figure 13B:
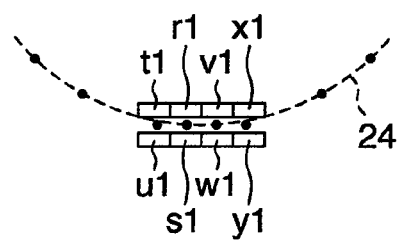
Figure 14A:
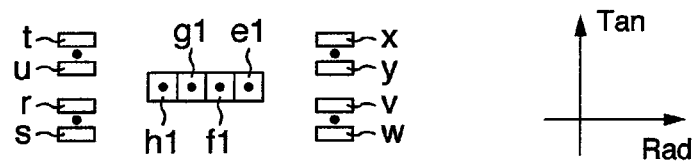
FIGS. 14A and 14B illustrate other light receiving parts in a different array, respectively, in the second embodiment of the present invention.
Figure 14A:
Figure 14A:
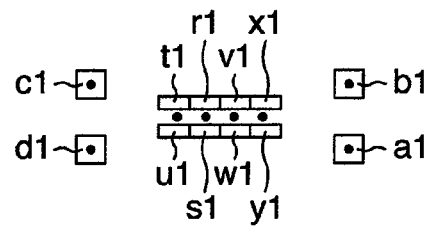
Figure 14B:
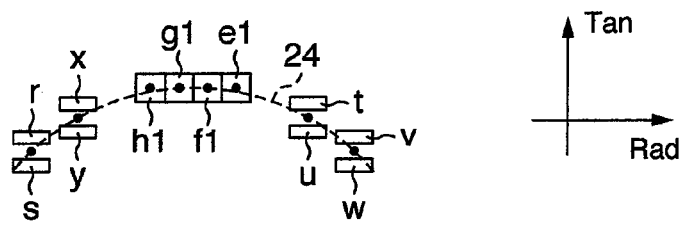
Figure 14B:
Figure 14B:
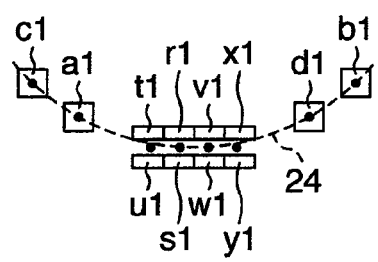
Figure 15A:
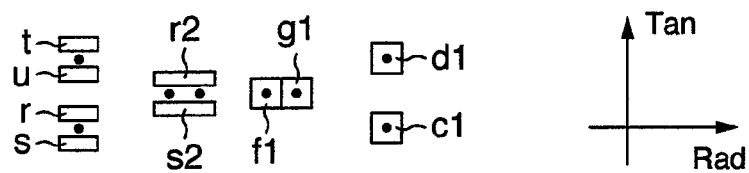
FIGS. 15A and 15B illustrate other light receiving parts in a different array, respectively, in the second embodiment of the present invention.
Figure 15A:
Figure 15A:
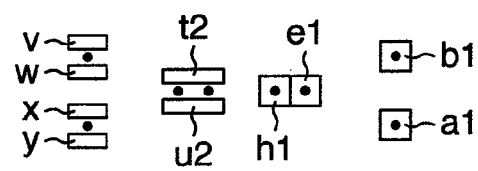
Figure 15B:
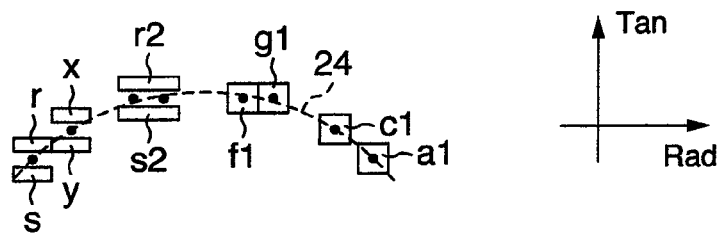
Figure 15B:
Figure 15B:
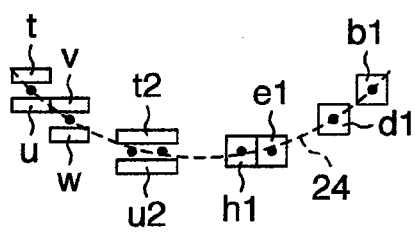

The optical pickup device according to the present embodiment is characterized by a construction in which the stray light is prevented from entering the light receiving part, and does not depend upon the methods for detection and the calculations of the focusing error signal and the tracking error signal. Further, there is no the need for both of the light receiving parts to be contacted with each other. Although, in the present embodiment, the +first order grating diffracted light and the −first order grating diffracted light of the region Di were not specified, for example, the +first order grating diffracted light and the −first order grating diffracted light may be diffracted in the Rad direction, and signals for adjustment and other servo signals such as a spherical aberration error signal may be detected by using them. Although in the present embodiment, the −first order grating diffracted light diffracted by the regions De, Df, Dg, and Dh was not detected, by providing additional light receiving part, the −first order grating diffracted light may be detected as the RF signal, the focusing error signal, the tracking error signal, and the signals for adjustment. In light of the above-description, the −first order grating diffracted light diffracted by the regions De, Df, Dg, and Dh may be detected as illustrated in FIGS. 13A and 13B to generate the focusing error signal. Further, based on a similar idea, the −first order grating diffracted light diffracted by the regions Da, Db, Dc, and Dd and the +first order grating diffracted light diffracted by the regions De, Df, Dg, and Dh may be detected as illustrated in FIGS. 14A and 14B to generate the tracking error signal. Furthermore, the +first order grating diffracted light diffracted by the remaining regions Da, Db, Dc, and Dd and the −first order grating diffracted light diffracted by the regions De, Df, Dg, and Dh may be detected to generate the focusing error signal. Furthermore, based on a similar idea, the −first order grating diffracted light diffracted by the regions Da, Db, De, and Dh and the +first order grating diffracted light diffracted by the regions Dc, Dd, Df, and Dg may be detected to generate the tracking error signal as illustrated in FIG. 15A, while the +first order grating diffracted light diffracted by the regions Da, Db, De, and Dh and the −first order grating diffracted light diffracted by the regions Dc, Dd, Df, and Dg may be detected to generate the focusing error signal. Alternatively, as illustrated in FIG. 15B, the −first order grating diffracted light diffracted by the regions Db, Dd, De, and Dh and the +first order grating diffracted light diffracted by the regions Da, Dc, Df, and Dg may be detected to generate the tracking error signal, while the +first order grating diffracted light diffracted by the regions Db, Dd, De, and Dh and the −first order grating diffracted light diffracted by the regions Da, Dc, Df, and Dg may be detected to generate the focusing error signal. In addition, the output signals from the optical pickup device may be reduced by connecting the light receiving parts with wires.

Third Embodiment

Figure 16:
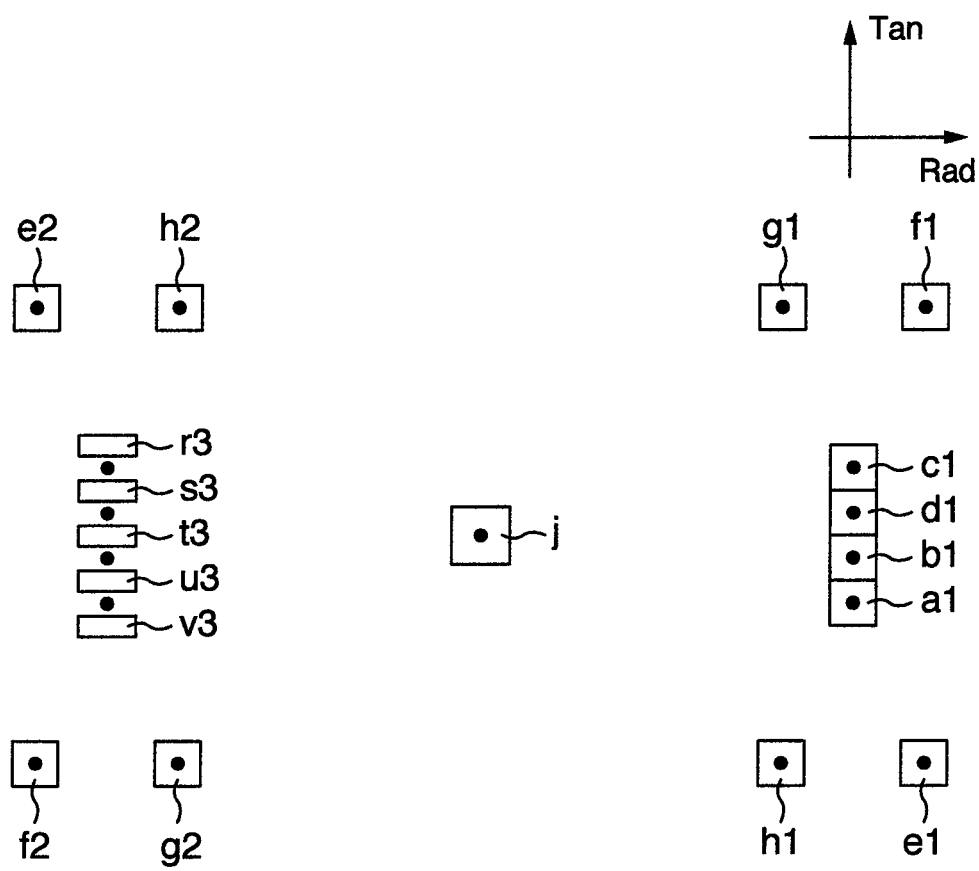
FIG. 16 illustrates light receiving parts according to a third embodiment of the present invention.

FIG. 16 illustrates light receiving parts of a photodetector of an optical pickup device according to a third embodiment of the present invention. A structural difference from the first embodiment is the photodetector 10 and the other structural elements of the second embodiment are similar to those of the first embodiment.

The grating 11 illustrated in FIG. 2 is formed by the regions De, Df, Dg, and Dh (region A) entered by only the zero-th order disc diffracted light of the disc diffracted light diffracted by the tracks on the optical disc, the regions Da, Db, Dc, and Dd (region B) entered by the zero-th order disc diffracted light and the ±first order disc diffracted light of the disc diffracted light, and the region Di (region C).

Suppose that a spectral ratio of the grating 11 is, for example, the zero-th order grating diffracted light: the +first order grating diffracted light: the −first order grating diffracted light=10:1:1. The photodetector 10 has a pattern as illustrated in FIG. 16. In the drawing, black points illustrate the zero-th order grating diffracted light and the ±first order grating diffracted light diffracted by the grating 11. In this case, the zero-th order grating diffracted light diffracted by the regions Da, Db, Dc, Dd, De, Df, Dg, Dh, and Di of the grating 11 enters the light receiving part j of the photodetector illustrated in FIG. 16. Further, the +first order grating diffracted light diffracted by the regions Da, Db, Dc, Dd, De, Df, Dg, and Dh of the grating 11 enters the light receiving parts a1, b1, c1, d1, e1, f1, g1, and h1, respectively. Further, the −first order grating diffracted light diffracted by the regions Da, Db, Dc, and Dd enters the light receiving parts r3, s3, t3, u3, and v3 for detecting a focusing error signal. The −first order grating diffracted light diffracted by the regions De, Df, Dg, and Dh enters the light receiving parts e2, f2, g2, and h2, respectively. Signals J0, A1, B1, C1, D1, E1, F1, G1, H1, E2, F2, G2, H2, R3, S3, T3, U3, and V3 obtained from the light receiving parts j, a1, b1, c1, d1, e1, f1, g1, h1, e2, f2, g2, h2, r3, s3, t3, u3, and v3 are calculated as follows to generate the focusing error signal (FES), the tracking error signal (TES), and the RF signal (RF).

$$FES = (R3 + T3 + V3) - (S3 + U3) \quad \text{[Equation 4]}$$
$$TES = \{(A1 + B1) - (C1 + D1)\} -$$
$$\quad kt \times \{(E1 + E2 + F1 + F2) - (G1 + G2 + H1 + H2)\}$$
$$RF = J0$$

Note that a symbol kt is a coefficient so as not to generate a DC component by the tracking error signal when the objective lens is displaced. In this case, for example, the knife edge method is used as the focus error detection method.

Figure 17:
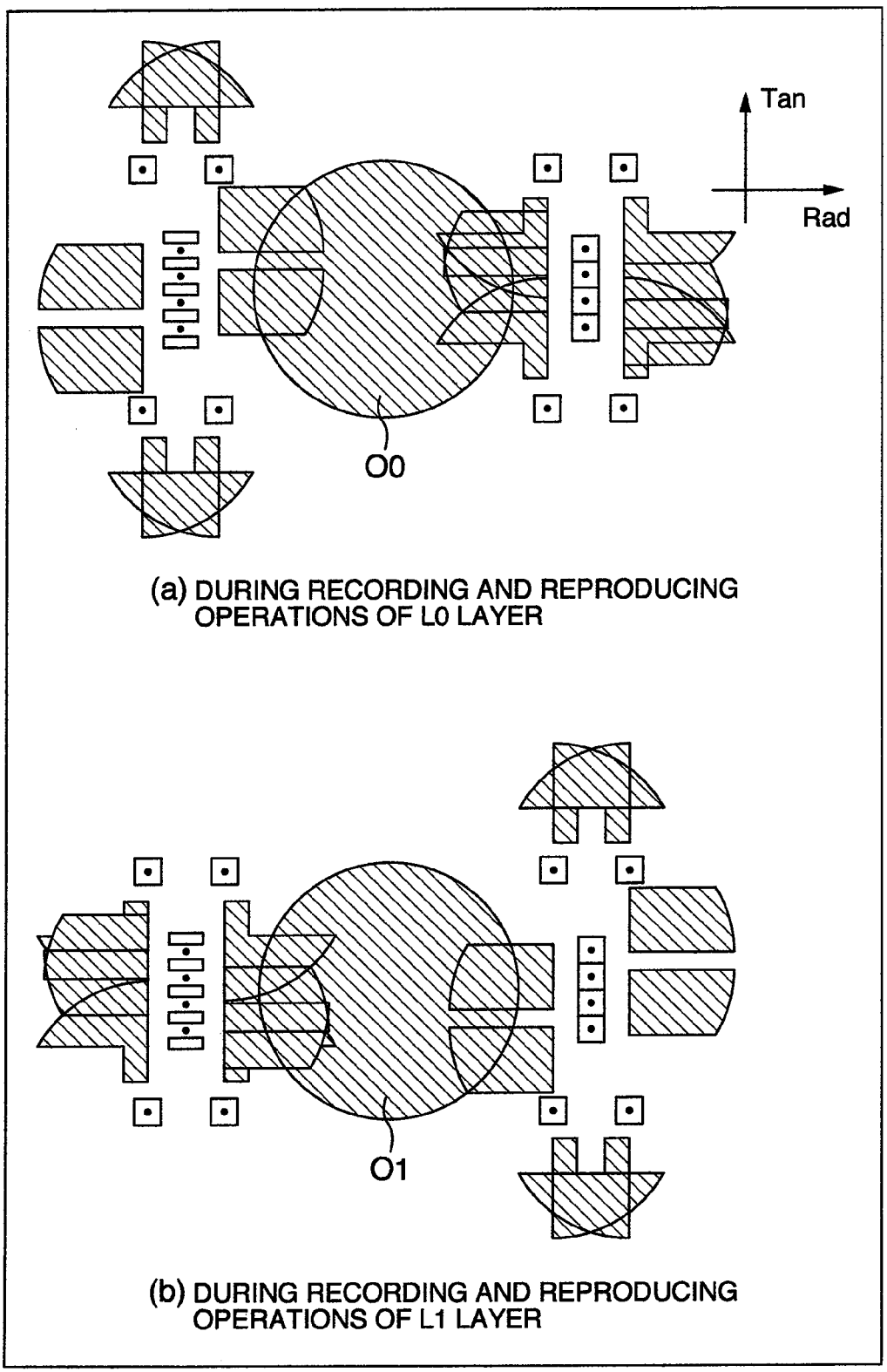
FIG. 17 illustrates a shape (on a photodetector) of stray light at the time when recorded on or reproduced from a dual layer disc in the third embodiment of the present invention.

FIG. 17 illustrates a relationship between the signal light and the stray light from the other layers during the recording and reproducing operations of the dual layer disc. FIG. 17 (a) illustrates a relationship between the signal light and the stray light from the other layers during the recording and reproducing operations of the L0 layer, and (b) illustrates a relationship between the signal light and the stray light from the other layers during the recording and reproducing operations of the L1 layer. Here, one stray light O0 and another stray light O1 illustrate the zero-th order grating diffracted light of stray light from the other layers at the L0 layer and the L1 layer, respectively. As can be seen from FIG. 17, the signal light and the stray light from the other layers do not overlap each other on the light receiving part except for the zero-th order grating diffracted light diffracted by the grating 11. Note that the signal J0 detected from the light receiving part j is not used for detecting the tracking error signal, but used for the reproduction signal, and therefore, even if the stray light is present, there is no problem from a practical standpoint.

Also as described in the first embodiment, in such a case that regions of the grating 11 have been separated along the Tan direction with respect to the optical beam center 15 (namely, regions Dh, De, Df, and Dg (region A)), it is desirable that the stray light is avoided along the Tan direction. Therefore, by avoiding the stray light along the Tan direction as in the light receiving parts e1 and h1, and f1 and g1 (e2 and h2, and 12 and g2) of FIG. 16, the stray light is prevented from entering the light receiving parts even if the objective lens is displaced in the Rad direction.

In such a case that regions of the grating 11 have been separated along the Rad direction with respect to the optical beam center 15 (namely, regions Da, Db, Dc, Dd (region B)), it is desirable that the stray light is avoided along the Rad direction. Therefore, by avoiding the stray light along the Rad direction as in the light receiving parts a1 and b1, and c1 and d1 of FIG. 16, adverse influences caused by the stray light diffracted by the other regions can be suppressed to a minimum effect. Further, the optical pickup device can have a construction if the distances between the light receiving part j and all the light receiving parts except the light receiving part j are widened, the stray light from the other layers of the zero-th order grating diffracted light is prevented from entering the light receiving part even when the stray light moves along with the displacement of the objective lens. Further, when the detection of RF signals is performed by one light receiving part, noises generated at the time of converting light into electric signals can be reduced. Therefore, the above-described construction is extremely advantageous from the viewpoint of the improvement in the signal-to-noise ratio of reproduction signals in the multilayer disc.

Figure 18A:
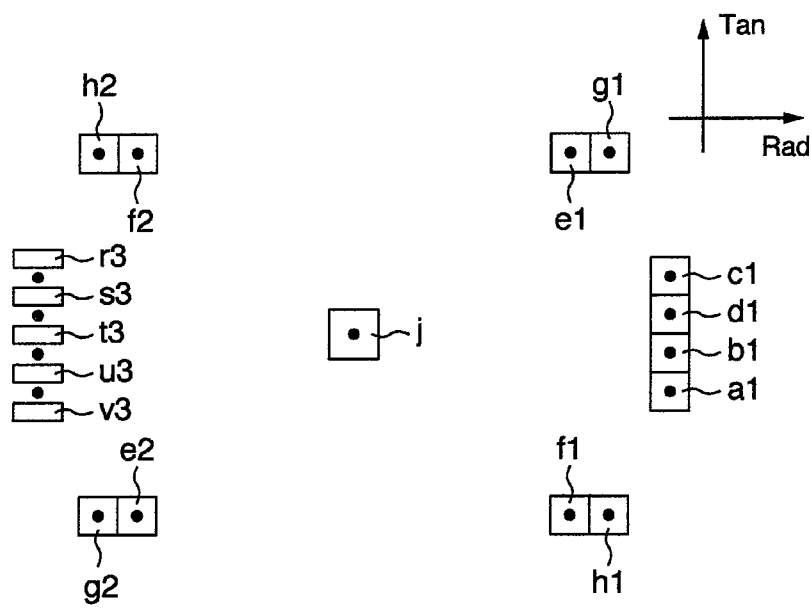
FIGS. 18A and 18B illustrate other light receiving parts in a different array, respectively, in the third embodiment of the present invention.
Figure 18B:
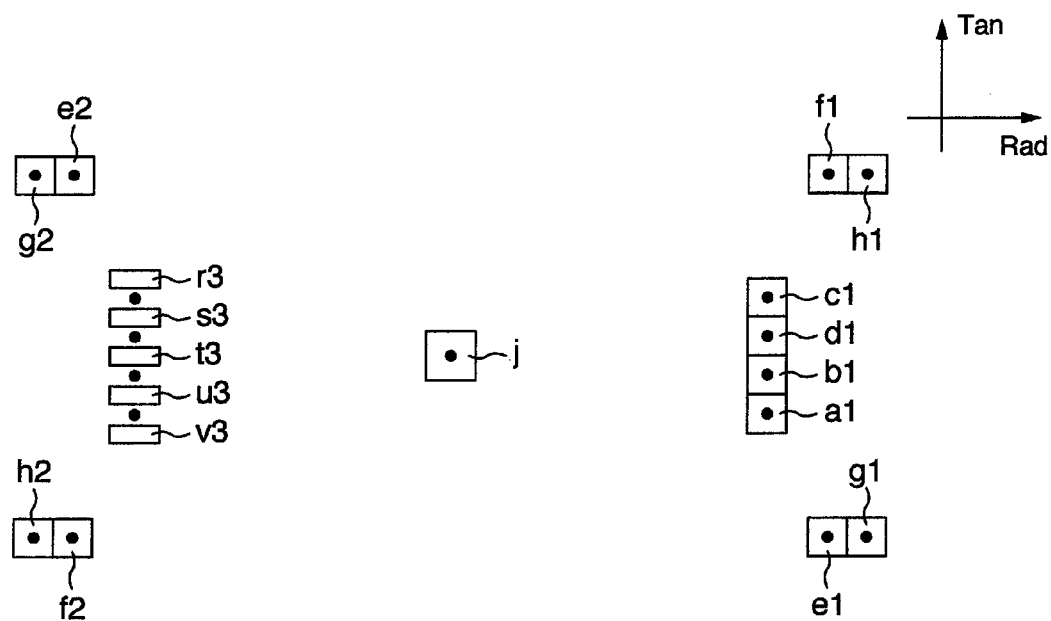
Figure 19:
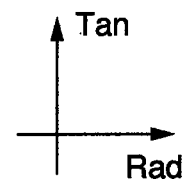
FIG. 19 illustrates other light receiving parts in a different array in the third embodiment of the present invention.
Figure 19:
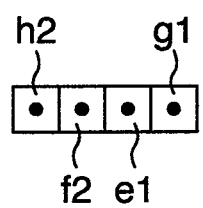
Figure 19:
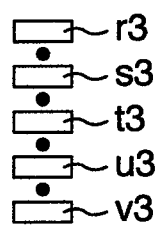
Figure 19:
Figure 19:
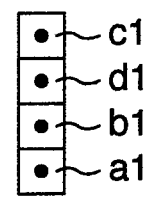
Figure 19:
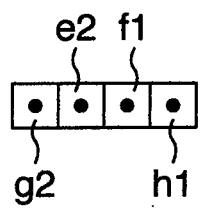

According to the present embodiment, the grating 11 is described with reference to FIG. 2, however, it is not limited thereto. For example, even if the patterns as illustrated in FIGS. 7A and 7B are used, a similar effect can be obtained. Further, for the purpose of eliminating the stray light except within an effective diameter of the signal light on the grating 11, if a region Z is formed on the grating 11 as illustrated in FIG. 8, a similar effect can be obtained. In this case, the grating 11 has a construction such that light entering the region Z is prevented from entering the light receiving parts. The region Z may be made by a grating structure, a multi-layer-film mirror, or a filter. Moreover, in the present embodiment, the grating 11 was arranged at the position after the optical beam has passed through the beam splitter 52. Alternatively, along with replacing the grating 11 by a polarizing diffraction grating, if the polarizing diffraction grating may be arrayed at a position before the optical beam passes through the beam splitter 52, a similar effect can be obtained. Also, although the optical disc having two layers has been described in the present embodiment, even when such optical discs having three or more layers are used, a similar effect can be obtained. In addition, as apparent from the foregoing description, there is no limitation as to the spherical aberration compensation method. The arrangement of the light receiving parts according to the present embodiment is one example. If the zero-th order grating diffracted light of the grating 11 with a large light amount is detected using one light receiving part and the light receiving parts for the ±first order grating diffracted light diffracted by the grating 11 or those for the grating diffracted light with the order larger than the first order are arranged so as to avoid the stray light of the zero-th order grating diffracted light, a similar effect can be obtained. Further, if the stray light of the regions in the Rad direction with respect to the grating center is separated from each other in the Rad direction, and when the stray light of the regions in the Tan direction with respect to the grating center is separated from each other in the Tan direction, it goes without saying that a similar effect can be obtained. For example, if the light receiving parts are arranged as illustrated in FIGS. 18A and 18B, a similar effect can be obtained. Further, there is no problem even if the light receiving parts f1, g1, e2 and h2, and those f2, g2, e1 and h1 in FIG. 16, and the light receiving parts e1, g1, f2 and h2, and those e2, g2, f1 and h1 in FIG. 18A are closely arranged. For example, the light receiving parts may be lined in a horizontal direction to detect as illustrated in FIG. 19.

The optical pickup device according to the present embodiment is characterized by a construction in which the stray light is prevented from entering the light receiving part, and does not depend upon the methods for detection and the calculations of the focusing error signal and the tracking error signal. Further, there is no the need for both of the light receiving parts to be contacted with each other. Although, in the present embodiment, the +first order grating diffracted light and the −first order grating diffracted light of the region Di were not specified, for example, the +first order grating diffracted light and the −first order grating diffracted light may be diffracted in the Tan direction, and signals for adjustment and other servo signals such as a spherical aberration error signal may be detected by using them. Furthermore, it goes without saying that the output signals from the optical pickup device may be reduced by connecting the light receiving parts with wires.

Fourth Embodiment

Figure 20:
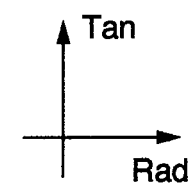
FIG. 20 illustrates light receiving parts according to a fourth embodiment of the present invention.
Figure 20:
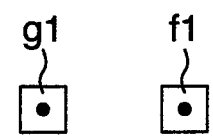
Figure 20:
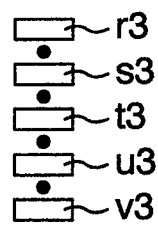
Figure 20:
Figure 20:
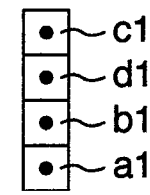
Figure 20:
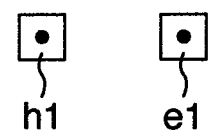

FIG. 20 illustrates light receiving parts of a photodetector of an optical pickup device according to a fourth embodiment of the present invention. A structural difference from the first embodiment is the photodetector 10 and the other structural elements of the present embodiment are similar to those of the first embodiment.

The grating 11 illustrated in FIG. 2 is formed by the regions De, Df, Dg, and Dh (region A) to which only the zero-th order disc diffracted light of the disc diffracted light diffracted by tracks on the optical disc enters, the regions Da, Db, Dc, and Dd (region B) to which the zero-th order disc diffracted light and the ±first order disc diffracted light of the disc diffracted light enter, and the region Di (region C).

Suppose that a spectral ratio of the grating 11 is, for example, the zero-th order grating diffracted light: the +first order grating diffracted light: the −first order grating diffracted light=10:1:1. The photodetector 10 has a pattern as illustrated in FIG. 20. In the drawing, black points illustrate the zero-th order grating diffracted light and ±first order grating diffracted light diffracted by the grating 11. In this case, the zero-th order grating diffracted light diffracted by the regions Da, Db, Dc, Dd, De, Df, Dg, Dh, and Di of the grating 11 enters the light receiving part j of the photodetector illustrated in FIG. 20. Further, the +first order grating diffracted light diffracted by the regions Da, Db, Dc, Dd, De, Df, Dg, and Dh of the grating 11 enters the light receiving parts a1, b1, c1, d1, e1, f1, g1 and h1, respectively. Further, the −first order grating diffracted light diffracted by the regions Da, Db, Dc, and Dd enters the light receiving parts r3, s3, t3, u3, and v3 for detecting the focusing error signal. In this case, the −first order grating diffracted light diffracted by the regions De, Df, Dg, and Dh does not enter the light receiving parts.

Signals J0, A1, B1, C1, D1, E1, F1, G1, H1, R3, S3, T3, U3, and V3 obtained from the light receiving parts j, a1, b1, c1, d1, e1, f1, g1, h1, r3, s3, t3, u3, and v3 are calculated as follows to generate the focusing error signal (FES), the tracking error signal (TES), and the RF signal (RF).

$$FES = (R3+T3+V3)-(S3+U3)$$

$$TES = \{(A1+B1)-(C1+D1)\}-kt \times \{(E1+F1)-(G1+H1)\}$$

$$RF = J0 \qquad \text{[Equation 5]}$$

Note that a symbol kt is a coefficient so as not to generate a DC component by the tracking error signal when the objective lens is displaced. In this case, for example, the knife edge method is used as the focus error detection method.

Since optical spots are arranged on the photodetector in the same manner as in the third embodiment, the stray light from the other layers during the recording and reproducing operations of the dual layer disc is prevented from entering the light receiving parts except for the zero-th order grating diffracted light diffracted by the grating 11. Note that the signal J0 detected from the light receiving part j is not used for detecting the tracking error signal, but used for a reproduction signal. Therefore, even if the stray light is present, there is no problem from a practical standpoint.

Also as described in the first embodiment, in such a case that regions of the grating 11 have been separated along the Tan direction with respect to the optical beam center 15 (namely, the regions Dh, De, Df, and Dg (region A)), it is desirable that the stray light is avoided along the Tan direction. Therefore, by avoiding the stray light along the Tan direction as in the light receiving parts f1 and g1, and e1 and h1 of FIG. 20, even if the objective lens is displaced in the Rad direction, the stray light is prevented from entering the light receiving parts. In such a case that regions of the grating 11 are separated along the Rad direction with respect to the optical beam center 15 (namely, the regions Da, Db, Dc, and Dd (region B)), it is desirable that the stray light is avoided along the Rad direction. Therefore, by avoiding the stray light along the Rad direction as in the light receiving parts a1, b1, c1, and d1 of FIG. 20, so that adverse influences caused by the stray light diffracted from the other regions can be suppressed to a minimum effect.

As described above, when the light receiving parts are arranged as illustrated in FIG. 20, the photodetector 10 can effectively separate the signal light from the stray light. Therefore, the photodetector 10 can detect the stable tracking error signal. Further, the optical pickup device has a construction in which when the distances between the light receiving part j and all the light receiving parts except the light receiving part j are widened, the stray light from the other layers of the zero-th order grating diffracted light is prevented from entering the light receiving part even when the stray light moves along with the displacement of the objective lens. Further, when the detection of RF signals is performed by one light receiving part as described above, noises generated at the time of converting light into electric signals can be reduced. Therefore, the above-described construction is extremely advantageous from the viewpoint of the improvement in the signal-to-noise ratio of reproduction signals in the multilayer disc.

Figure 21A:
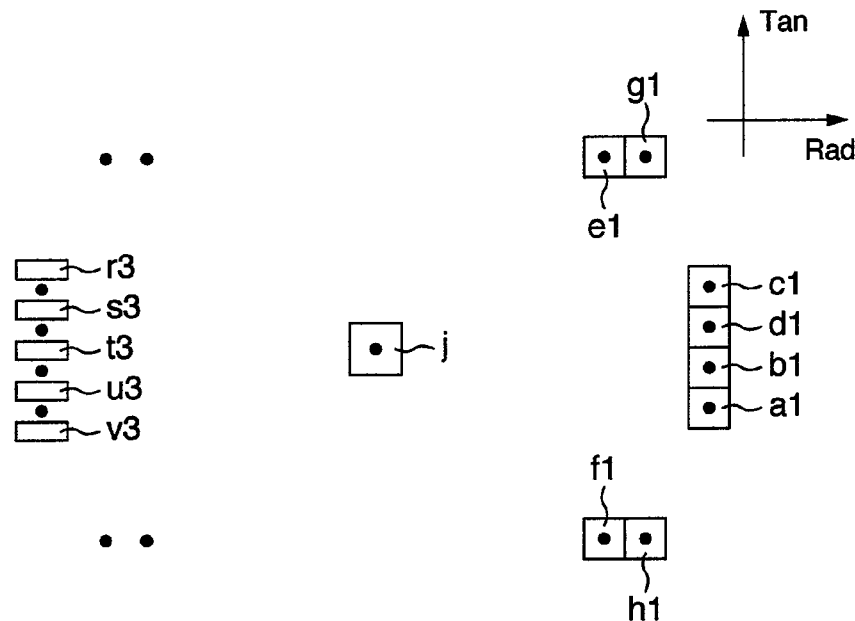
FIGS. 21A and 21B illustrate other light receiving parts in a different array, respectively, in the fourth embodiment of the present invention.
Figure 21B:
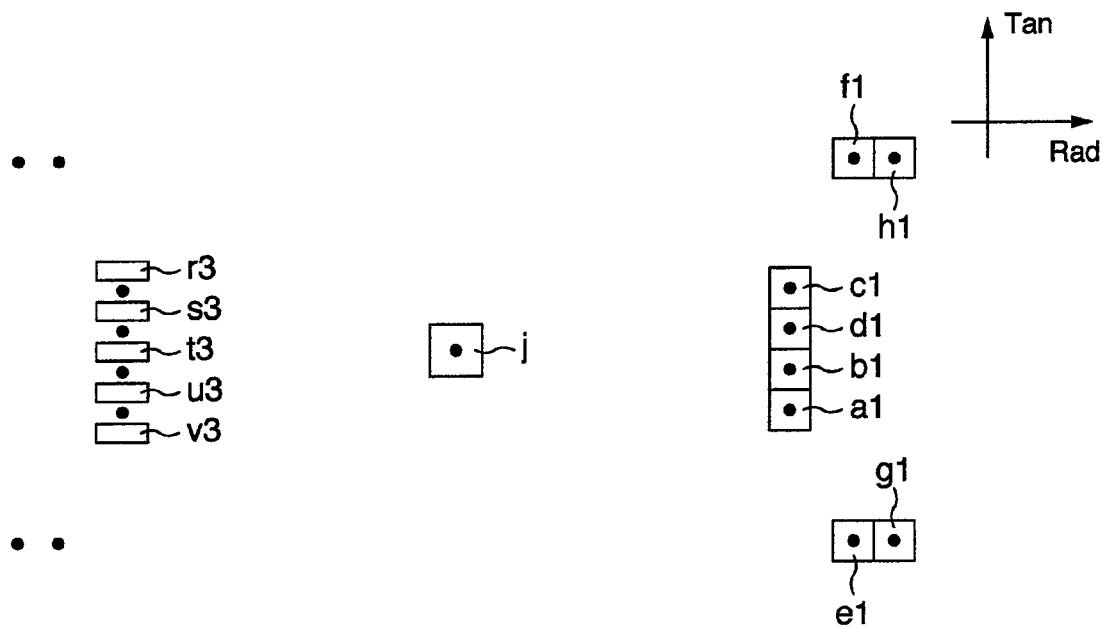

According to the present embodiment, the grating 11 is described with reference to FIG. 2, however, it is not limited thereto. For example, even if the patterns as illustrated in FIGS. 7A and 7B are used, a similar effect can be obtained. Further, for the purpose of eliminating the stray light except within an effective diameter of the signal light on the grating 11, if a region Z is formed on the grating 11 as illustrated in FIG. 8, a similar effect can be obtained. At this time, the grating 11 has a construction such that light entering the region Z is prevented from entering the light receiving parts. The region Z may be made by a grating structure, a multilayer-film mirror, or a filter. Moreover, in the present embodiment, the grating 11 was arranged at the position after the optical beam has passed through the beam splitter 52. Alternatively, along with replacing the grating 11 by a polarizing diffraction grating, if the polarizing diffraction grating may be arrayed at a position before the optical beam passes through the beam splitter 52, a similar effect can be obtained. Also, although the optical disc having two layers has been described in the present embodiment, even when such optical discs having three or more layers are used, a similar effect can be obtained. Furthermore, if the constitution is such that the stray light of the regions in the Rad direction with respect to the grating center is separated from each other in the Rad direction and the stray light of the regions in the Tan direction with respect to the grating center is separated from each other in the Tan direction, a similar effect can be obtained. For example, if the light receiving parts are arranged as illustrated in FIGS. 21A and 21B, a similar effect can be obtained.

Figure 22A:
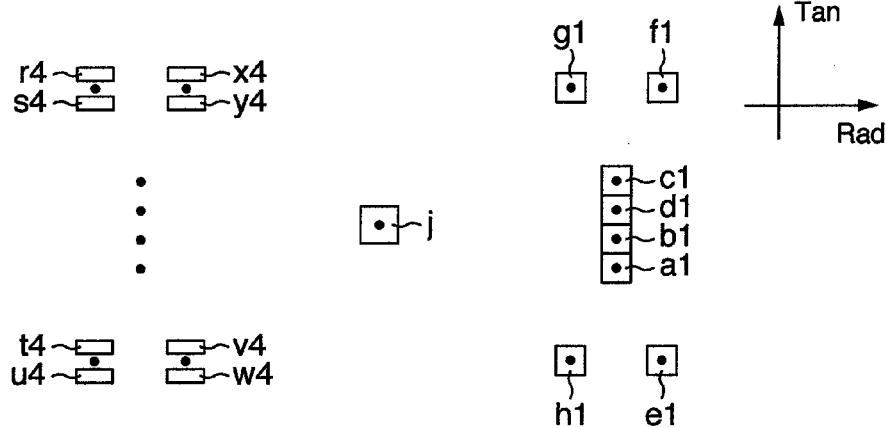
FIGS. 22A to 22C illustrate other light receiving parts in a different array, respectively, in the fourth embodiment of the present invention.
Figure 22B:
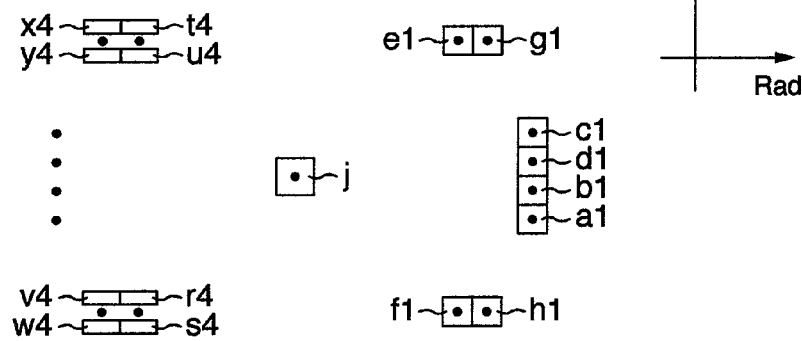
Figure 22C:
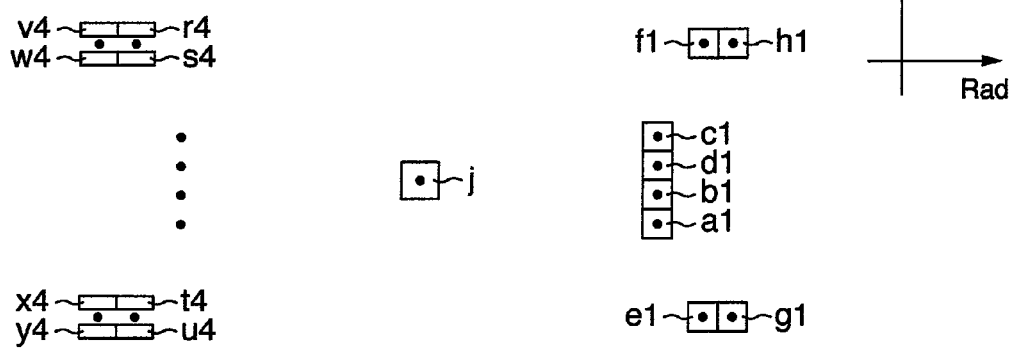
Figure 23A:
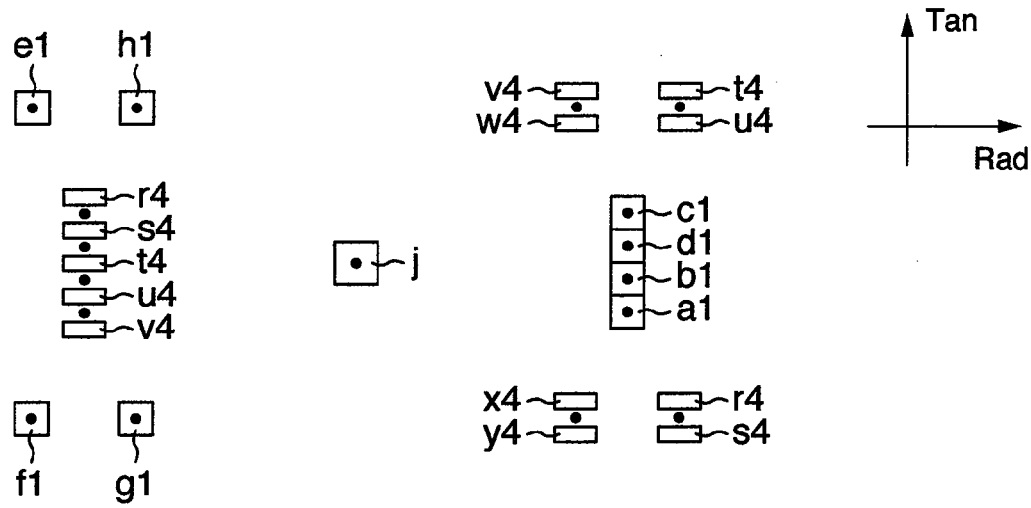
Figure 23B:
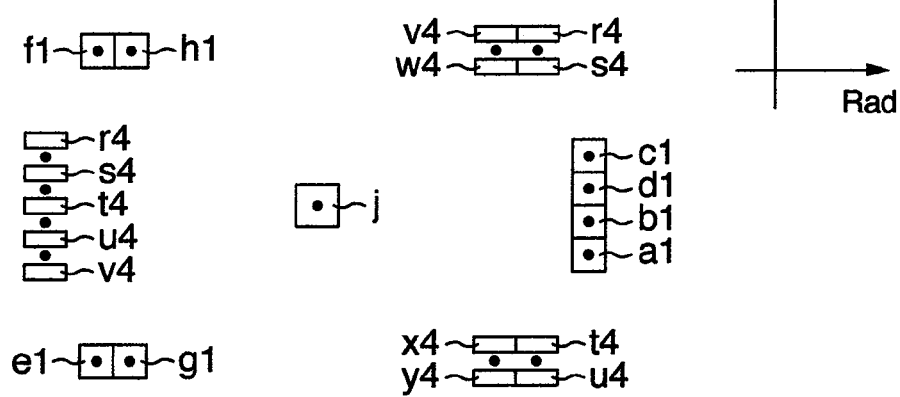
Figures 23C, 23D:
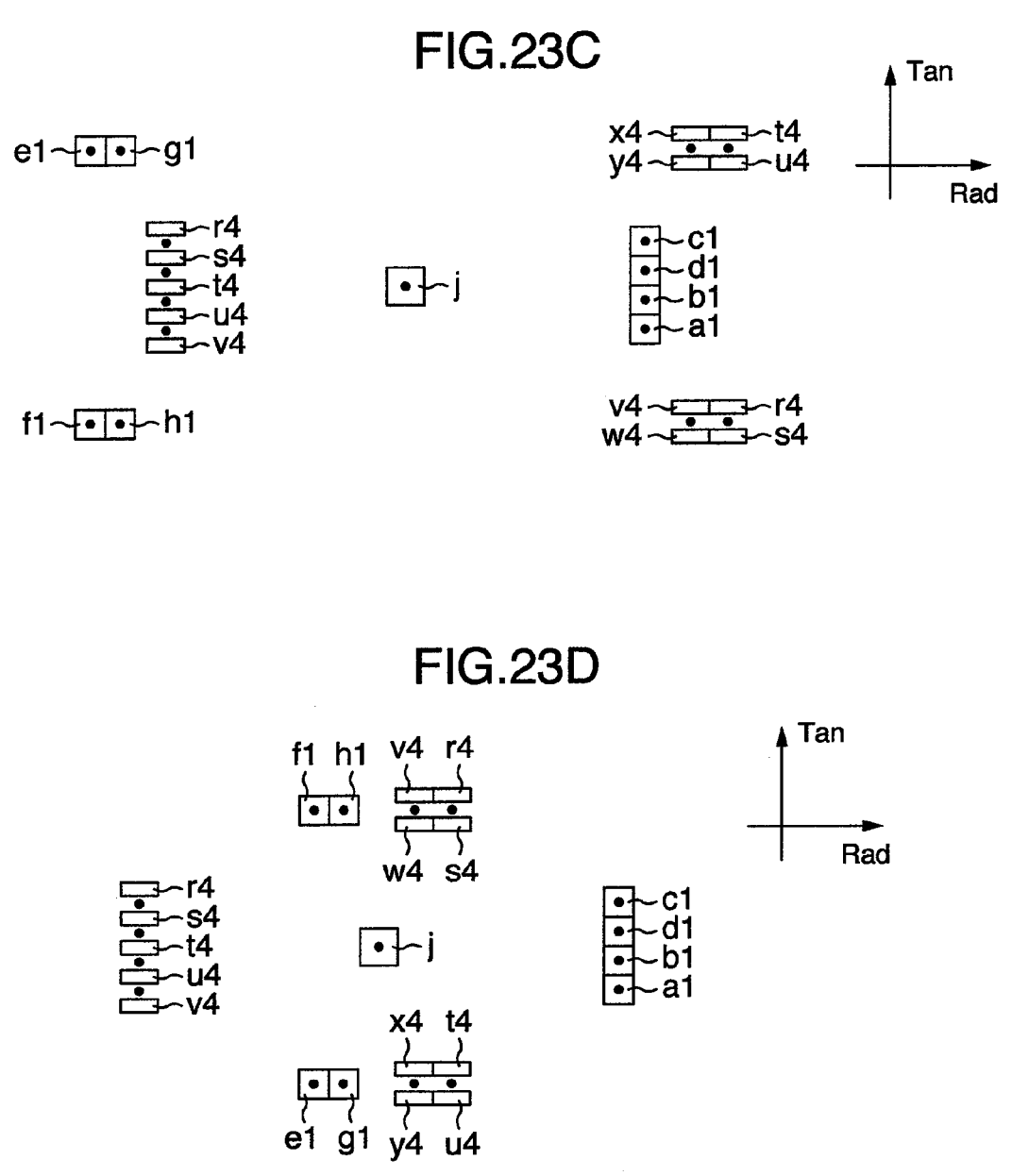
Figure 24A:
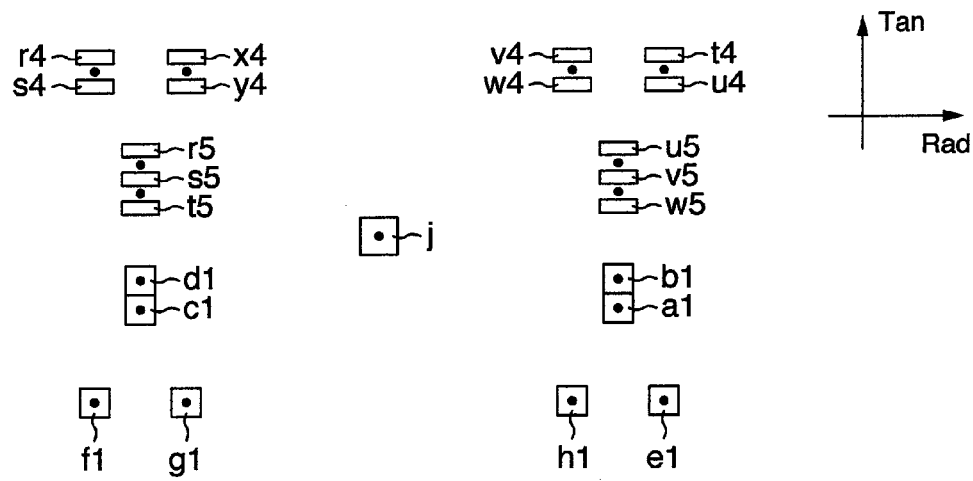
FIGS. 24A to 24D illustrate other light receiving parts in a different array, respectively, in the fourth embodiment of the present invention.
Figure 24B:
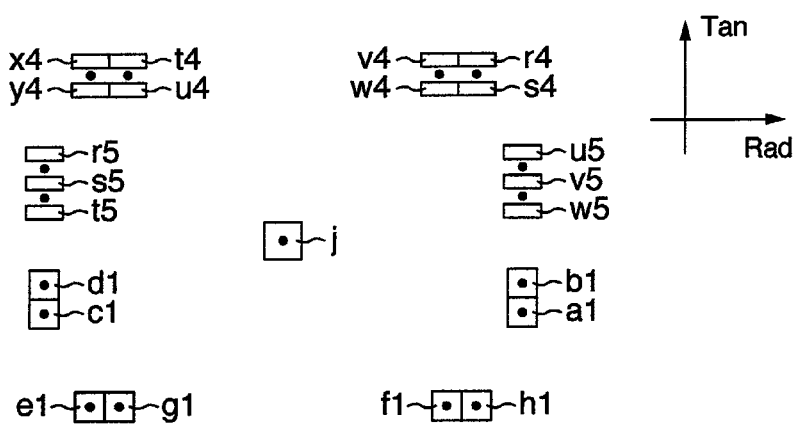
Figure 24C:
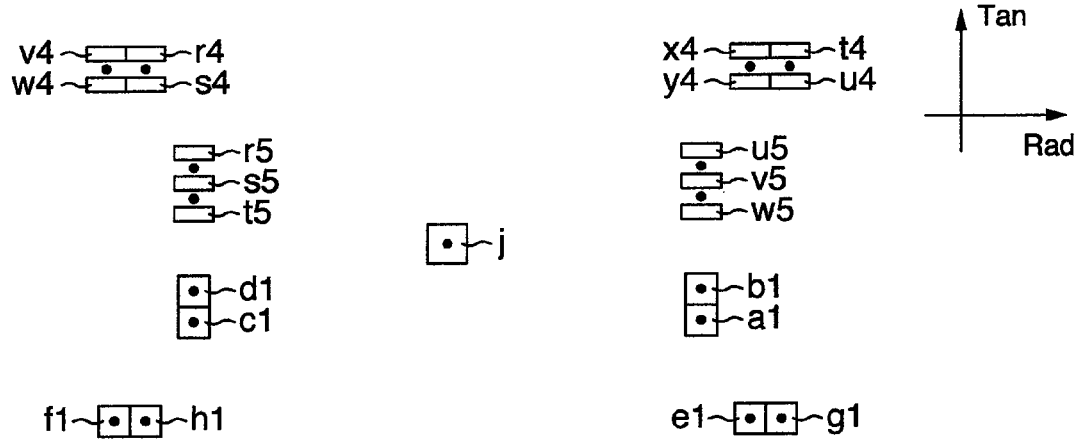
Figure 24D:
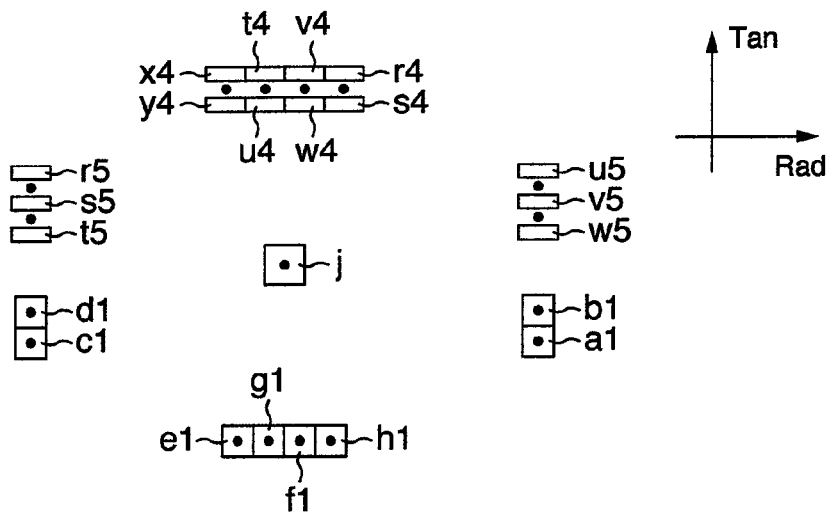

The optical pickup device according to the present embodiment is characterized by a construction in which the stray light is prevented from entering the light receiving part, and does not depend upon methods for detection and calculations of the focusing error signal and the tracking error signal. Further, there is no the need for both of the light receiving parts to be contacted with each other. Although, in the present embodiment, the +first order grating diffracted light and the −first order grating diffracted light of the region Di were not specified, for example, the +first order grating diffracted light and the −first order grating diffracted light may be diffracted in the Tan direction, and signals for adjustment and other servo signals such as a spherical aberration error signal may be detected by using them. When considering the above-described content, the −first order grating diffracted light diffracted by the regions De, Df, Dg, and Dh may be detected as illustrated in FIGS. 22A to 22C to generate the focusing error signal. Further, based on a similar idea, the +first order grating diffracted light diffracted by the regions Da, Db, Dc, and Dd and the −first order grating diffracted light diffracted by the regions De, Df, Dg, and Dh may be detected as illustrated in FIGS. 23A to 23D to generate the tracking error signal, while the −first order grating diffracted light diffracted by the remaining regions Da, Db, Dc, and Dd and the +first order grating diffracted light diffracted by the regions De, Df, Dg, and Dh may be detected to generate the focusing error signal. Furthermore, based on a similar idea, the +first order grating diffracted light diffracted by the regions Da, Db, De, and Dh and the −first order grating diffracted light diffracted by the regions Dc, Dd, Df, and Dg may be detected to generate the tracking error signal as illustrated in FIGS. 24A to 24D, while the −first order grating diffracted light diffracted by the regions Da, Db, De, and Dh and the +first order grating diffracted light diffracted by the regions Dc, Dd, Df, and Dg may be detected to generate the focusing error signal. In addition, the output signals from the optical pickup device may be reduced by connecting the light receiving parts with wires.

Fifth Embodiment

Figure 25:
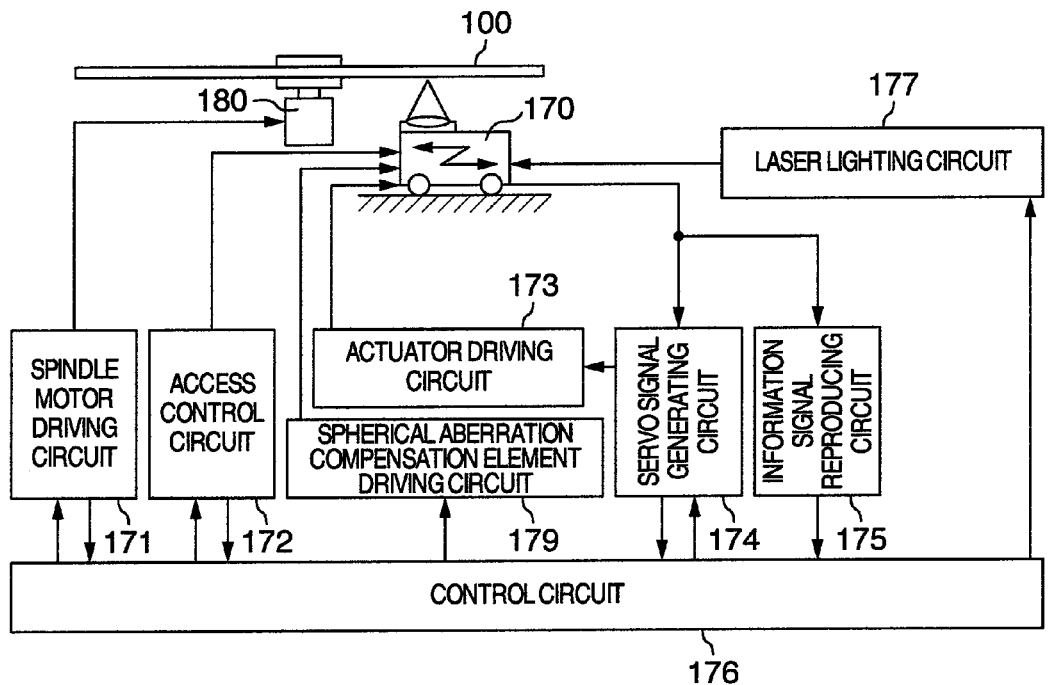
FIG. 25 illustrates an optical reproducing device according to a fifth embodiment of the present invention.

In a fifth embodiment, optical reproducing apparatus having mounted with an optical pickup device 170 will be described. FIG. 25 illustrates a schematic construction of the optical reproducing apparatus. The optical pickup device 170 has a mechanism capable of being driven along the Rad direction of an optical disc 100, and is position-controlled according to access control signals from an access control circuit 172.

A predetermined laser drive current is supplied to the laser diode within the optical pickup device 170 from a laser lighting circuit 177, and laser light is emitted from the laser diode with a predetermined light amount according as the reproduction. In addition, the laser lighting circuit 177 can be incorporated into the optical pickup device 170.

Signals output from the photodetector 10 within the optical pickup device 170 are sent to a servo signal generating circuit 174 and an information signal reproducing circuit 175. The servo signal generating circuit 174 generates servo signals such as a focusing error signal, a tracking error signal, and a tilt control signal based on the signals from the photodetector 10. Based on the servo signals, the servo signal generating circuit 174 drives an actuator within the optical pickup device 170 via an actuator driving circuit 173, and controls the position of an objective lens.

The information signal reproducing circuit 175 generates information signals recorded on the optical disc 100 based on the signals from the photodetector 10.

A part of the signals obtained by the servo signal generating circuit 174 and the information signal reproducing circuit 175 are sent to a control circuit 176. A spindle motor driving circuit 171, the access control circuit 172, the servo signal producing circuit 174, the laser lighting circuit 177, and a spherical aberration compensation element driving circuit 179 are connected to this control circuit 176. The control circuit 176 performs the rotation control of the spindle motor 180 which rotates the optical disc 100, the control of access direction and access position, the servo control of the objective lens, the control of the light amount of the laser diode emission within the optical pickup device 170, and the spherical aberration compensation due to a difference of the disc plate thickness.

Sixth Embodiment

Figure 26:
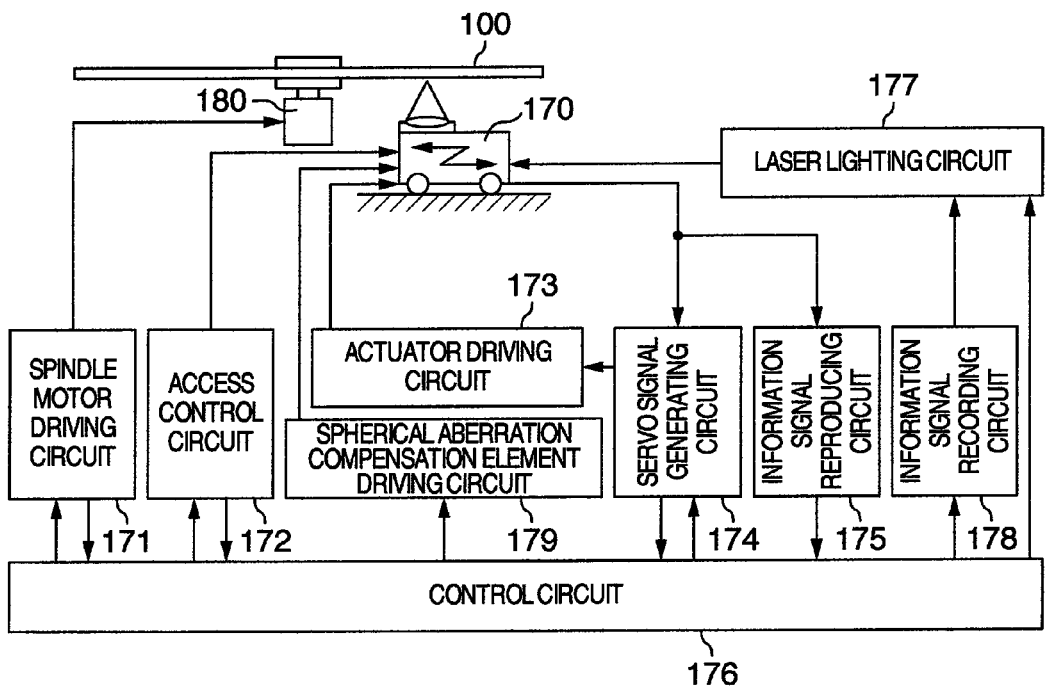
FIG. 26 illustrates an optical recording and reproducing device according to a sixth embodiment of the present invention.

In a sixth embodiment, optical recording and reproducing apparatus mounted with the optical pickup device 170 will be described. FIG. 26 illustrates a schematic arrangement of the optical recording and reproducing apparatus. The optical recording and reproducing apparatus of this sixth embodiment has the below-mentioned different points from that of the optical recording and reproducing apparatus illustrated in FIG. 25: an information signal recording circuit 178 is provided between the control circuit 176 and the laser lighting circuit 177, thereby a function is added in which the lighting of the laser lighting circuit 177 is controlled based upon a recording control signal supplied from the information signal recording circuit 178 so as to write desirable information to the optical disc 100.

In addition, the present invention is not limited to the above-described embodiments, but includes various modifications. For example, the above-described embodiments are described in detail in order to clearly describe the present invention, and are not necessarily limited to the optical pickup device and optical disc apparatus having all the described constructions. Further, a part of constructions according to one embodiment can be replaced by those according to the other embodiments, and the constructions according to the other embodiments can be added to that according to one embodiment. Furthermore, it is possible to delete, or replace a part of the constructions according to each embodiment with the constructions according to the other embodiments.

The invention claimed is:

1. An optical pickup device comprising:
   a laser diode which emits laser light;
   an objective lens which irradiates an optical beam emitted from the laser diode on an optical disc having at least a first recording layer and a second recording layer;
   a grating which branches an optical beam reflected by an information recording layer on the optical disc into a plurality of optical beams by a plurality of regions in the grating; and
   a photodetector having a plurality of light receiving parts which detect the optical beams branched by the plurality of regions in the grating, wherein:
   the photodetector has one light receiving part which detects a reproduction signal, and
   in case of focusing on the first recording layer as an intended information recording layer of the optical disc, zero-th order grating diffracted light of the grating reflected by the first and second recording layers is irradiated only to the one light receiving part which detects the reproduction signal among the light receiving parts.

2. An optical pickup device comprising:
   a laser diode which emits laser light;
   an objective lens which irradiates an optical beam emitted from the laser diode on an optical disc having at least a first recording layer and a second recording layer;
   a grating which branches an optical beam reflected by an information recording layer on the optical disc into a plurality of optical beams by a plurality of regions in the grating; and
   a photodetector having a plurality of light receiving parts which detects an optical beam reflected by an information recording layer on the optical disc, wherein:
   the photodetector has one light receiving part which detects a reproduction signal,
   in case of focusing on the first recording layer as an intended information recording layer of the optical disc, zero-th order grating diffracted light of the grating reflected by the first and second recording layers are irradiated only to the one light receiving part which detects the reproduction signal among the light receiving parts, and
   all the light receiving parts, except the one light receiving part which detects the reproduction signal on the photodetector, are arranged outside zero-th order grating diffracted light of the grating reflected by the first and second recording layers of the optical disc.

3. An optical pickup device comprising:
   a laser diode which emits laser light;
   an objective lens which irradiates an optical beam emitted from the laser diode on an optical disc;
   an actuator which displaces the objective lens in a radius direction of the optical disc;

a grating which branches an optical beam reflected by an information recording layer on the optical disc into a plurality of optical beams; and one photodetector having a plurality of light receiving parts which receives optical beams branched by the plurality of regions on the grating, wherein:

the photodetector has a first light receiving part which detects zero-th order grating diffracted light of the grating and a plurality of second light receiving parts which detects grating diffracted light having an order more than or equal to that of ±first order grating diffracted light, a detected signal of the zero-th order grating diffracted light of the grating is defined as a reproduction signal, a detected signal of the grating diffracted light having an order more than or equal to that of the ±first order grating diffracted light is defined as a signal for servo controlling, and the plurality of second light receiving parts are arranged outside optical beams reflected by all recording and reproducing layers except an intended information recording layer of the optical disc.

4. The optical pickup device according to claim 3, wherein when focusing on an intended information recording layer of the optical disc, the first light receiving part on the photodetector is arranged outside the grating diffracted light having an order more than or equal to that of the ±first order grating diffracted light of an optical beam reflected by all the recording and reproducing layers except the intended information recording layer of the optical disc.

5. The optical pickup device according to claim 3, wherein the second light receiving parts of the photodetector are arranged in a shape of a substantial circular arc or a substantial circle such that the first light receiving part of the photodetector is substantially centered.

6. The optical pickup device according to claim 3, wherein when focusing on the intended information recording layer of the optical disc, an optical beam reflected by the intended information recording layer focuses on a light receiving part of the photodetector.

7. The optical pickup device according to claim 3, wherein a light amount of the zero-th order grating diffracted light is larger than that of the grating diffracted light having an order more than or equal to that of the ±first order grating diffracted light of the grating.

8. The optical pickup device according to claim 3, wherein:
the grating has at least three sets of regions A, B, and C;
among disc diffracted light diffracted by tracks on the optical disc, the region A of the grating diffracts the zero-th order disc diffracted light;
at least the ±first order disc diffracted light enters the region B;
the photodetector detects a reproduction signal from the zero-th order grating diffracted light diffracted by the grating regions A, B, and C; and
among the light receiving parts which detect either the +first order grating diffracted light or the −first order grating diffracted light of the region A, at least two light receiving parts are arrayed in a substantially straight line along a direction which is substantially coincident with a radial direction of the optical disc.

9. The optical pickup device according to claim 3, wherein:
the grating has at least three sets of regions A, B, and C;
among disc diffracted light diffracted by tracks on the optical disc, the region A of the grating diffracts the zero-th order disc diffracted light;
at least the ±first order disc diffracted light enters the region B;
the photodetector detects a reproduction signal from the zero-th order grating diffracted light diffracted by the grating regions A, B, and C; and
among the light receiving parts which are the second light receiving parts and detect the +first order grating diffracted light or the −first order grating diffracted light of the region B, at least two light receiving parts are arrayed in a substantially straight line along a direction which is made substantially coincident with a tangential direction of the optical disc.

10. The optical pickup device according to claim 8, wherein a tracking error signal is generated from a detected signal of the grating diffracted light diffracted by the grating region A and a detected signal of the grating diffracted light diffracted by the grating region B.

11. The optical pickup device according to claim 1, wherein a focusing error signal is detected by a double knife edge method.

12. The optical pickup device according to claim 2, wherein transmissivity in a region of a side outer than a contour of an optical beam of signal light on the grating becomes smaller than that of a region that the signal light enters.

13. The optical pickup device according to claim 2, wherein in a region of a side other than a contour of an optical beam of signal light on the grating, optical beams reflected by all the recording and reproducing layers except the intended information recording layer are irradiated to a region different from the light receiving part of the photodetector.

14. The optical pickup device according to claim 2, wherein an optical beam that entered a region of a side outer than a contour of an optical beam of signal light on the grating is reflected by the grating.

15. An optical disc apparatus mounted with the optical pickup device according to claim 1, a laser lighting circuit which drives the laser diode used in the optical pickup device, a servo signal generating circuit for generating the focusing error signal and a tracking error signal by using signals detected by the photodetector used in the optical pickup device, and an information signal reproducing circuit for reproducing an information signal recorded on the optical disc.

* * * * *